US012401515B2

(12) United States Patent
Constable et al.

(10) Patent No.: US 12,401,515 B2
(45) Date of Patent: Aug. 26, 2025

(54) ENHANCED LOGIN PROCESSES USING PROPRIETARY SECURITY AND PROTOCOL FOR SHARING AND MANAGING PERSONAL INFORMATION

(71) Applicant: Atsign, Inc., San Jose, CA (US)

(72) Inventors: Colin Constable, San Jose, CA (US); Kevin Nickels, San Jose, CA (US)

(73) Assignee: Atsign, Inc., San Jose, CA (US)

( * ) Notice: Subject to any disclaimer, the term of this patent is extended or adjusted under 35 U.S.C. 154(b) by 94 days.

(21) Appl. No.: 18/570,187

(22) PCT Filed: Jun. 16, 2022

(86) PCT No.: PCT/US2022/033854
§ 371 (c)(1),
(2) Date: Dec. 14, 2023

(87) PCT Pub. No.: WO2022/266364
PCT Pub. Date: Dec. 22, 2022

(65) Prior Publication Data
US 2024/0146533 A1     May 2, 2024

Related U.S. Application Data

(60) Provisional application No. 63/211,664, filed on Jun. 17, 2021.

(51) Int. Cl.
*H04L 9/32*     (2006.01)
*H04L 9/30*     (2006.01)

(52) U.S. Cl.
CPC .......... *H04L 9/3226* (2013.01); *H04L 9/3073* (2013.01); *H04L 9/3271* (2013.01)

(58) Field of Classification Search
CPC ... H04L 9/3226; H04L 9/3073; H04L 9/3271; H04L 63/107; H04L 67/1021;
(Continued)

(56) References Cited

U.S. PATENT DOCUMENTS 6,343,361 B1 *   1/2002   Nendell .............. H04L 63/0428
                                                                                                                             380/278
8,594,632 B1    11/2013   Azizi et al.
(Continued)

FOREIGN PATENT DOCUMENTS

WO    WO 2019/226115      11/2019

OTHER PUBLICATIONS

Extended European Search Report in European Appln. No. 22825850.5, mailed on Jun. 27, 2024, 9 pages.
(Continued)

*Primary Examiner* — Izunna Okeke
(74) *Attorney, Agent, or Firm* — Fish & Richardson P.C.

(57) ABSTRACT

The present disclosure involves systems, software, and computer implemented methods for enhanced login processes. A first login page of a website is received that includes a field that enables a user to enter a handle for a decentralized resource directory. A handle for the decentralized resource directory is received in the field and provided to a webserver. A second login page is received that includes a challenge code for the handle. A challenge value is generated based on the challenge code. A location in the decentralized resource directory is determined, based on the challenge value. A request is sent to a protocol server that manages the personalized resource directory to store the challenge value in the decentralized resource directory at the location as a login challenge response for logging into the website. A login result page is received that indicates a result of the webserver processing the login challenge response.

20 Claims, 21 Drawing Sheets

(58) Field of Classification Search
CPC ..... H04L 9/0825; H04L 9/3247; H04L 63/08; H04L 63/0853; H04L 63/101; H04L 63/12

See application file for complete search history.

(56) References Cited

U.S. PATENT DOCUMENTS

| | | | |
|---|---|---|---|
| 9,083,531 | B2 | 7/2015 | Chenna |
| 9,258,118 | B1 | 2/2016 | Roth et al. |
| 9,571,480 | B1 | 2/2017 | Asveren |
| 11,271,933 | B1 | 3/2022 | Dee |
| 11,546,337 | B2 | 1/2023 | Le et al. |
| 11,849,053 | B2 | 12/2023 | Nickels et al. |
| 2004/0044727 | A1 | 3/2004 | Abdelaziz et al. |
| 2007/0118879 | A1 | 5/2007 | Yeun |
| 2008/0091615 | A1 | 4/2008 | Choi et al. |
| 2015/0178515 | A1 | 6/2015 | Cooley et al. |
| 2016/0182500 | A1 | 6/2016 | Ligatti et al. |
| 2017/0257358 | A1 | 9/2017 | Ebrahimi et al. |
| 2018/0367526 | A1 | 12/2018 | Huang et al. |
| 2019/0149539 | A1 | 5/2019 | Scruby |
| 2020/0085408 | A1 | 3/2020 | Lemaitre et al. |
| 2020/0145451 | A1 | 5/2020 | Hansen |
| 2020/0252392 | A1 | 8/2020 | Mullins et al. |
| 2021/0058374 | A1 | 2/2021 | Smith et al. |
| 2021/0110015 | A1* | 4/2021 | McCarty ................. G06F 21/32 |
| 2021/0272120 | A1* | 9/2021 | Murdoch ........... G06Q 20/3829 |
| 2021/0288973 | A1 | 9/2021 | Dimble et al. |
| 2023/0015819 | A1 | 1/2023 | Nickels et al. |
| 2024/0039739 | A1 | 2/2024 | Nickels et al. |

OTHER PUBLICATIONS

International Preliminary Report on Patentability in International Appln. No. PCT/US2021/040628, dated Jan. 19, 2023, 12 pages.

International Preliminary Report on Patentability in International Appln. No. PCT/US2022/033854, mailed on Dec. 14, 2023, 7 pages.

International Search Report and Written Opinion in International Appln. No. PCT/US2021/040628, mailed on Dec. 2, 2021, 15 pages.

International Search Report and Written Opinion in International Appln. No. PCT/US2022/033854, mailed on Oct. 25, 2024, 8 pages.

Li et al. "Research on CoAP Resource Directory Based on Blockchain." IEEE 4th Information Technology, Networking, Electronic and Automation Control Conference (ITNEC), May 2020, 1:1730-1735.

Ylonen et al., "Security of interactive and automated access management using Secure Shell (SSH)," National Institute of Standards and Technology, Oct. 2015, 50 pages.

* cited by examiner

ENHANCED LOGIN PROCESSES USING PROPRIETARY SECURITY AND PROTOCOL FOR SHARING AND MANAGING PERSONAL INFORMATION

CLAIM OF PRIORITY

This application claims priority under 35 USC § 119(e) to U.S. Patent Application Ser. No. 63/211,664, filed on Jun. 17, 2021, the entire contents of which are hereby incorporated by reference.

CROSS-REFERENCE TO RELATED APPLICATIONS

This application is related to PCT Application PCT/US2021/040628, filed Jul. 7, 2021, titled "AUTOMATION OF USER IDENTITY USING NETWORK PROTOCOL PROVIDING SECURE GRANTING OR REVOCATION OF SECURED ACCESS RIGHTS"; the contents of which are hereby incorporated by reference.

TECHNICAL FIELD

The present disclosure relates to computer-implemented methods, software, and systems for enhanced login processes using a proprietary protocol for sharing and managing personal information.

BACKGROUND

Peer-to-peer (P2P) computing or networking is a distributed application architecture that can include partitioning of tasks between peer computing devices. Peers can form a peer-to-peer network of nodes. In a P2P environment, peers can make a portion of their resources, data, and/or metadata, such as processing power, disk storage or network bandwidth, directly available to other network participants, without requiring central coordination. Peers can be both suppliers and consumers of resources, in contrast to a traditional client-server model in which servers supply resources and clients consume resources.

SUMMARY

The present disclosure involves systems, software, and computer implemented methods for enhanced login processes using a proprietary protocol for sharing and managing personal information.

An example system includes a first user device of a user, a protocol server associated with the user comprising a decentralized resource directory, and a webserver associated with a website. The first user device is configured to send a request to the webserver for a first login page of the website. The webserver is configured to: receive the request for the first login page of the web site; generate the first login page of the web site, wherein the first login page includes a field that enables the user to enter a handle for the decentralized resource directory; and provide the first login page of the website to the first user device. The first user device is further configured to: receive the first login page of the web site; present the first login page of the web site; receive, from the user, the handle for the decentralized resource directory; and provide the handle for the decentralized resource directory to the web server. The web server is further configured to: receive the handle for the decentralized resource directory from the first user device; generate a unique challenge code for the handle; insert the unique challenge code for the handle into a second login page; and provide the second login page that includes the unique challenge code for the handle to the first user device. The first user device is further configured to: receive the second login page that includes the unique challenge code for the handle; present the second login page that includes the unique challenge code for the handle; obtain the unique challenge code for the handle from the second login page; generate a challenge value based on the unique challenge code; determine, based on the challenge value, a location in the decentralized resource directory; and send a request to the protocol server to store the challenge value in the decentralized resource directory at the location. The webserver is further configured to: send a request to the protocol server to obtain the challenge value from the location in the decentralized resource directory; receive the challenge value from the protocol server; generate a server challenge value, using the challenge code sent to the first user device and the handle received from the first user device, to compare to the challenge value received from the protocol server; determine whether the server challenge value matches the challenge value received from the protocol server; log the user into the website in response to determining that the server challenge value matches the challenge value received from the protocol server; and deny a login request to the web site for the user in response to determining that the server challenge value does not match the challenge value received from the protocol server.

An example method includes: receiving a request from a user device of a user for a first login page of a website; generating the first login page of the website, wherein the first login page includes a field that enables the user to enter a handle for a decentralized resource directory; providing the first login page of the website to the user device; receiving the handle for the decentralized resource directory from the user device; generating a unique challenge code for the handle; inserting the unique challenge code for the handle into a second login page; providing the second login page that includes the unique challenge code for the handle to the user device; sending a request to a protocol server to obtain a challenge value stored by the user device at a location in a decentralized resource directory associated with the handle, wherein the challenge value and the location are generated by the user device based on the challenge code; receiving the challenge value from the protocol server; generating a server challenge value, using the challenge code sent to the user device and the handle received from the user device, to compare to the challenge value received from the protocol server; determining whether the server challenge value matches the challenge value received from the protocol server; logging the user into the website in response to determining that the server challenge value matches the challenge value received from the protocol server; and denying a login request to the website for the user in response to determining that the server challenge value does not match the challenge value received from the protocol server.

Another example method includes: sending a request to a webserver for a first login page of a website; receiving the first login page of the website, wherein the first login page includes a field that enables a user to enter a handle for a decentralized resource directory; presenting the first login page of the website; receiving, from the user, the handle for the decentralized resource directory; providing the handle for the decentralized resource directory to the webserver; receiving, from the webserver, a second login page that includes a unique challenge code for the handle that was generated by the webserver; presenting the second login page that includes the unique challenge code for the handle; obtaining the unique challenge code for the handle from the second login page; generating a challenge value based on the unique challenge code; determining, based on the challenge value, a location in the decentralized resource directory; sending a request to a protocol server to store the challenge value in the decentralized resource directory at the location as a login challenge response for logging into the website; and receiving from the webserver, a login result page that indicates a result of the webserver processing the login challenge response.

Implementations may include one or more of the following features. The first user device can be configured to cryptographically sign the challenge value for the handle using a private key of a public/private key pair for the handle. The webserver can be further configured to: send a request to the protocol server to obtain a public key of the public/private key pair for the handle from the decentralized resource directory; receive, from the protocol server, the public key of the public/private key pair for the handle; and decrypt the challenge value using the public key. The private key of the public/private key pair for the handle can be stored on the first user device. The first user device can be configured to cryptographically sign the challenge value for the handle using a public key of a public/private key pair associated with the website. The webserver can be further configured to decrypt the challenge value using a private key of the public/private key pair associated with the website. The first login page can include a field that allows the user to provide a user-provided code. The first user device can be configured to provide the user-provided code to the web server along with the handle of the user. The web server can be configured to generate the challenge code using the user-provided code. The system can include a second user device of the user. The first login page can be presented on the first user device and the user second device can be configured to generate the challenge value, determine the location in the decentralized resource directory, and send the request to the protocol server to store the challenge value in the decentralized resource directory at the location. The challenge code can be a scannable code that is presented on the first user device and the second user device can be configured to scan the scannable code that is presented on the first user device. The decentralized resource directory can include shared user information for the user that the user has explicitly shared with an entity associated with the website. The webserver can be further configured to: send a request to the protocol server for the shared user information for the user in the decentralized resource directory that has been explicitly shared with the entity associated with the website; receive the shared user information; use the shared user information to generate at least one web page for the user while the user is logged into the website; and provide the at least one web page to the first user device. The first user device can be further configured to generate the challenge value based on the unique challenge code by generating a hash value of a combination of the handle and the unique challenge code. The first user device can be further configured to: generate a nonce value; generate the challenge value based on the challenge code and the nonce value; and send a request to the protocol server to store the nonce value in the decentralized location at a location that is based on the challenge code. The web server is further configured to: send a request to the protocol server to obtain the nonce from the decentralized resource directory; receive the nonce from the protocol server; and use the nonce when generating the server challenge value.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
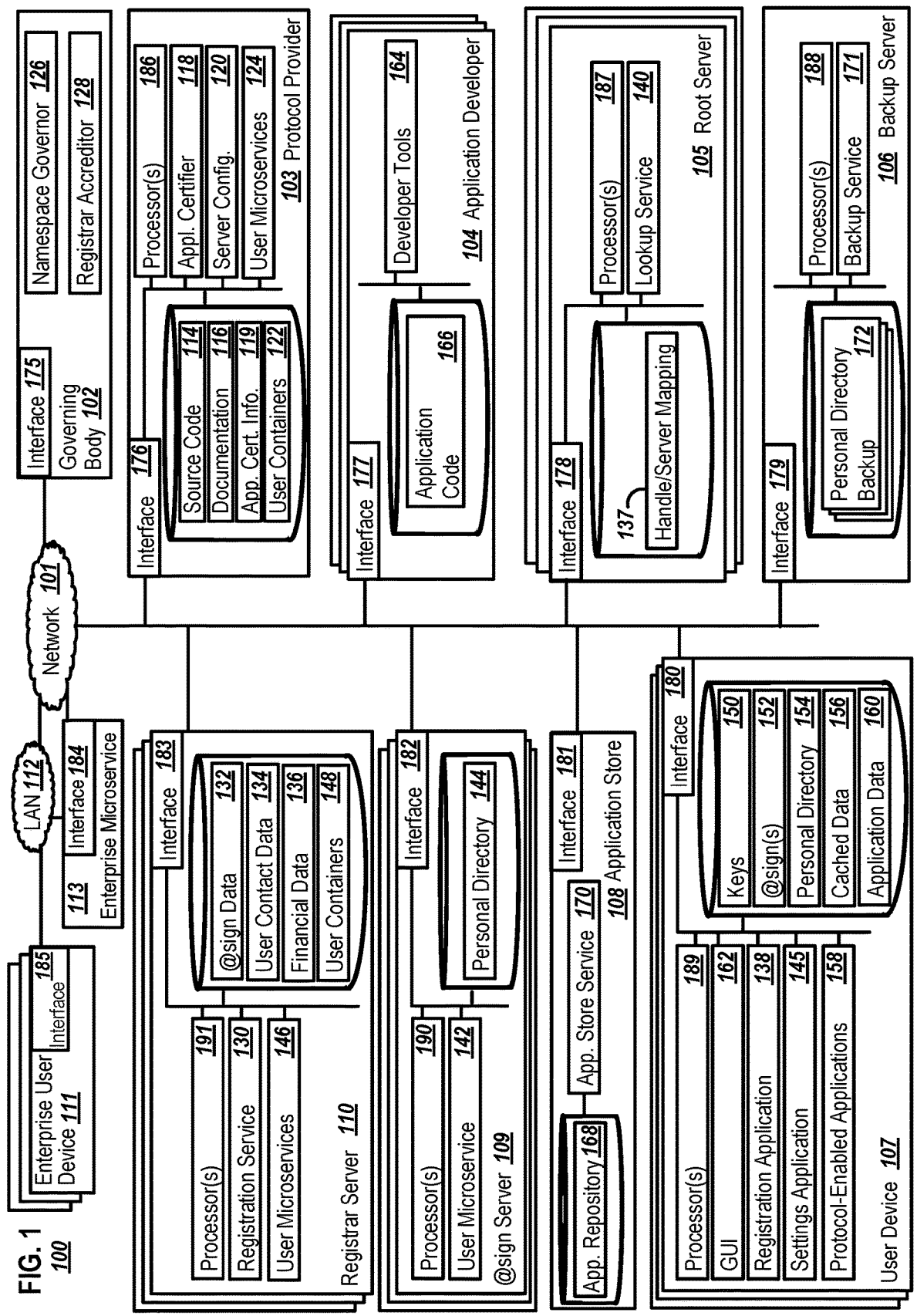
FIG. 1 is a block diagram illustrating an example system for user-controlled access control for user information.

As the Internet has grown into every facet of modern life, some of the most problematic issues people face are managing their identities and securing their data. Additionally, website and application developers may have to manage the identity of people thereby assuming an associated risk of managing data of other parties and incurring associated hosting and infrastructure costs. Applications that are monetized through advertising that includes tracking and identifying users can further result in various privacy concerns.

To solve these and other problems, an improved and novel Internet Protocol (IP)-based communication protocol and system can be used to provide robust privacy controls for secure exchanges of information between entities. In particular, the solution provides protocol users with the ability to personally maintain and manage sharing of their personal information and data without reliance on a third-party service or application's settings and restrictions. The system includes a namespace directory, decentralized resource directories with secure key/value persistence, and a protocol (which can be referred to as the "@protocol") for communication between entities. Information, including both data and services, can be securely and privately exchanged over the protocol.

As used herein, "users" or "protocol users" refer to users of the @protocol. Each protocol user can be a person, and it follows that multiple users can be "people." A respective person can use the protocol, with any suitable device, including their own personal device, which can be referred to a "user device," or "client device." In general, a computing device that participates in the protocol can be associated with a participating entity, which can be a person, a corporate or other broader entity, or a finer-grained entity such as a specific item or "thing" (such as an IoT (Internet of Things)) device. Each entity that uses the protocol can be represented by a handle, which can be referred to as an "@sign". Example @signs can include @alice, @bob, sales@amco, and myfurnace@alice. For a corporate or other entity, various handles can be supported, such as a handle for the entity itself (e.g., @amco), a handle for a general role for the entity (e.g., sales@amco), and a handle for specific users associated with the entity (e.g., alice.smith@amco).

The namespace directory can be used for storing a list of unique identifiers (e.g., "@signs") of protocol users together with routing information for the identifiers. Routing information can include, for example, a DNS (Domain Name System) location and IP port number of individual decentralized resource directory servers (which can be referred to as @sign servers) to which protocol requests can be routed.

A response to a data or service request can be provided by a decentralized resource directory server based on a secure key/value persistence of the decentralized resource directory. A request can include an indication of a requested data item or service, as well as a target entity of the request. For example, a service-related request can have a syntax of a form of "service@entity." Processing of a protocol request can include operations to ensure that both entities in an exchange are known to each other and that the request is permission checked before an appropriate response is determined and returned. Response information returned for a service@entity request can include or refer to (e.g., by value or by reference) information stored in a secure key/value persistence for the entity.

The @protocol can allow for a person or an entity to configure the person or entity's own data records to be either publicly accessible (e.g., available to anyone who is aware of a corresponding key) or to be private (e.g., with limited, controlled access) and require validation of a requesting entity for access, where only people or entities specified by the person or entity who owns the data records can access the data, or corresponding portions if limited by the person or entity. As described in more detail below, some keys for public data can be discovered/exposed using a scan while other keys may not be discoverable by a scan. Access control for private data can be hard coded into the system rather than as an overlay data structure. To access private data, a requesting entity can be required to first prove, using the @protocol, a claimed identity, so that access rights can be determined. Accordingly, a response to a private data request can be based on a validated identifier of the requestor, and responses can vary between different requesting entities based on their respective level of approved access. For example, a person can configure permissions so that a query sent to the person for the person's location can result in different responses of "USA," "Minnesota," or an actual physical address, if sent from an unknown sender, a casual acquaintance, or a close friend, respectively, based on respective grants previously granted to respective entities. The person can also configure permissions for the location data so that no response is given to requests received from unknown senders.

The features of the protocol can form a unique Internet permissioning system for securely controlling access to data and services. Permissioned access can be controlled strictly by an owner of a specific private namespace granting access to data or service(s) of the owner. Access grants can be subject to revocation by the owner.

The permissioning system can provide various advantages. Several advantages relate to an enhanced level of control for people of their own personal information. For example, people are able to specify their own terms and conditions for the use of their data. Specified terms can be defined in a data-use license and/or terms of service document, for example. A person can specify in a data-use license that a particular data item can be looked up but not stored or replicated, for instance.

The @protocol is designed to only allow connections to occur when permission has been granted by the owner of each respective @sign handle. The response to a query, including whether to respond at all, as well as the payload of a response, is completely under the control of the owner of the @sign, which can allow for fine- or coarse-grained control of responses, which can include different responses to a same query to different users or entities. As a particular example, the protocol can enable a person, such as a person or user associated with the @sign of "@alice," to share information, such as email, websites, credit card numbers, location data, or preferences, to other people or entities, such as a person "@bob," under the complete control of and according to the personally-defined rules and permission of @alice alone.

Providing each person or entity control of their own information can improve user experiences in a variety of ways. For example, the described method of directly asking Internet users for their information can allow for new application experiences providing less annoyance for both the requester and the user to whom the request is sent. The @protocol, with a set of predefined verbs, which can be different in (e.g., extended for) particular implementations can provide an ease of use and intuitiveness for protocol users. The system can provide people, entities, and even physical items (e.g., "things")— or authorized users or persons associated therewith—a single location to manage digital information and a simple mechanism to allow others to request that information. Each protocol user, entity, or physical item can have and share a respective @sign, which can be used by others for future data requests. A simple @sign can be shared (e.g., on or as a business card, via text, email, or verbally, etc.), rather than separate items of information that may become outdated at some point. Sharing an @sign (e.g., @alice or sales@acme) can enable the contacting of Alice @alice or the sales role at AcmeCo, respectively, even if Alice's actual contact details change or if the actual person or people in the sales role at Acme company change.

Generally, the protocol provides a hierarchical and decentralized permissioning system for establishing security and trust as a core part of the Internet, whether between people or between people and entities (e.g., brands). Respective @sign servers can participate in the @protocol without being surveilled or managed by a central entity. Additionally, end-to-end encrypted P2P applications that exchange data using the @protocol can be used without being subject to centralized surveillance, since they do not communicate through centralized and shared backend servers. Rather, protocol-enabled P2P applications can communicate directly with other applications at the edge of the decentralized network after a connection between peers is established.

As another example, data managed by the system can be housed, for instance, in billions of independent @sign servers (which can be implemented as server devices and/or user devices), with each server storing data in a secure and encrypted manner. In contrast to a large database housed on a centralized system that may be vulnerable to a single security attack, any security attack that might be undertaken against the decentralized permissioning system would have to be performed separately against each @sign server, which would be cost and time prohibitive. Decentralized systems can be more trustworthy than a centralized system that has an inherently higher risk (and perhaps history) of data breaches for centrally-stored data. Historical security issues with centralized systems generally result in erosion of trust in the centralized system.

The @protocol is designed as a low-level, real-time Internet permissions protocol. The permissions-based protocol is low-level in that it can prevent a transfer of secured data until permission is verified. Permissions are checked prior to any data transfer, and data is only transferred in response to a successful verification, thereby providing a near real time response that ensures current data, in some cases, without—or with reduced—caching. Application developers (and in some cases, application users) can specify caching parameters for an application, such as whether caching of data is intended or preferred, for instance.

The system supporting the @protocol is based on a global-scale architecture that is dependable as the system scales. Distributed @sign servers and an addressing scheme can support at least one hundred billion people, entities, and things, for example. Dependability is achieved based on architectural designs for confidentiality, integrity, and availability.

The open-source @protocol has a well-defined architecture and a reference implementation codebase that can be published to third party reviewers to facilitate code review and extensive security testing. The architecture is grounded in fundamental tenets of 1) distributing data when possible and centralizing data when necessary, 2) requiring permission for data access, and 3) empowering ownership of data. The @protocol provides a well-defined set of functionality that is extensible, enabling developers to add useful extensions and take advantage of the security and protection offered by the solution.

Application developers can beneficially leverage various aspects of the @protocol. With protocol-enabled applications, users own and control their own data, so applications can be automatically compliant with GDPR (General Data Protection Regulation), CCPA (California Consumer Privacy Act), and other current and future privacy regulations. With personal data used by an application being stored with the person, the person, and not an application provider, stores keys and other sensitive information, such as personally identifiable information (PII). There is no longer a reason for the developer to add warnings to forms or other areas of an application or site where the user is entering data, as may be required for other applications and prior solutions. Automatic privacy compliance can result in a more empowering, reassuring experience for the user and less effort for a developer, as well as an inherent security to the system from end to end.

User management, particularly of personal information, therefore, can be minimal (or non-existent) for an application developer, and can result in applications not needing an expensive backend infrastructure. Building an infrastructure to house and back up customer data can be a costly and time consuming part of application development. An application being developed to use the @protocol can save costs and time in getting the application to market, as compared to approaches that need development of a backend infrastructure, including security and storage. Fully decentralized P2P apps that have data stored on users' individual @servers may not require any backend infrastructure, for example, which can save substantial costs for the developer.

Liability for data breaches may no longer exist for an application when the application developer does not hold any of the user's data. If the developer chooses to have personal data hosted on personal servers, for example, the individual people can become responsible for their own data, with the developer using best practices and the described @protocol to request and receive access to the personal data. Developers therefore, may avoid a liability for sensitive personal data, and can limit the amount of collected and managed data held by the application.

Additionally, data management can be simplified, both for the developer and for the user. For example, password retrieval and out-of-date email addresses, if managed by the application developer, can create a large support burden for application providers. By using the @protocol, developers no longer have to develop functionality for and support password, login, and other personal data management. Once a user has an @ handle, they do not need to create a username or password for @protocol-compatible sites or applications—instead, they can simply use their @handle, and can verify themselves via the @protocol solution as described herein. Accordingly, the user can get started more easily with a new protocol-enabled application, resulting in a more satisfying user experience, which can benefit the developer as well as the user.

FIG. 1 is a block diagram illustrating an example system 100 for user-controlled access control for user information. Specifically, the illustrated system 100 includes or is communicably coupled with various components that are connected by one or more public network(s) 101. For example, the system 100 includes a governing body 102, a protocol provider server 103, application developers 104, root servers 105, backup servers 106, user devices 107, an application store 108, protocol servers 109 (e.g., @sign servers), and registrar servers 110. Additionally, in some implementations, the system 100 includes enterprise user devices 111 that might not be directly connected to the public network(s) 101, but are, for example, on a local area network 112, behind a firewall in an enterprise, and connected to an enterprise microservice server 113 that is connected to the local area network 112 and the public network 101 that can do protocol exchanges on behalf of the enterprise user devices 111. Although shown separately, in some implementations, functionality of two or more systems or servers may be provided by a single system or server. In some implementations, the functionality of one illustrated system or server may be provided by multiple systems or servers.

The system 100 provides an ecosystem of compliant applications and services for granting or denying access rights in real time. The protocol, as implemented in the system 100, can create a network of trust with structured data on a global scale. The protocol can be built upon protocols of TCP/IP (Transmission Control Protocol/Internet Protocol), DNS, HTTP (HyperText Transfer Protocol) (e.g., with future browser enhancements) and SSL/TLS (Secure Sockets Layer/Transport Layer Security). Use of the protocol can result in secure sharing of data and services between @handle owners and applications as specified in @sign servers, if explicitly allowed by both parties of a transaction. The protocol can be used for a large number of use cases that can benefit from user controlled privacy access. The protocol supports both a public lookup (in which the party querying data does not have to prove who they are) and a private lookup that confirms the @sign of the entity asking for information and allows the owner of the data to decide what information to share. Public lookups in general can be used to confirm the existence of an @sign or access specific information that may be set to public access.

The protocol can be provided/developed by a protocol provider (shown interfacing with the system 100 by the protocol provider server 103). Although a single protocol provider server 103 is shown, the protocol provider can be associated with various types and numbers of servers. And while shown as a single entity, the protocol provider can include or encompass different entities, such as a non-profit organization/foundation tasked with promoting and supporting the protocol and/or a company that provides various services and policies for the protocol.

For example, the protocol provider server 103 can provide a source code distribution 114 and a documentation distribution 116, include an application certifier 118 that generates application certification information 119, and include a server configuration component 120 for configuring the root servers 105. As another example, the protocol provider server 103 can provide secondary user server infrastructure and services, using user containers 122 and user microservices 124. The components of the protocol provider server 103 are described in more detail below.

In some implementations, the protocol provider server 103 provides governance of the protocol namespace. In other implementations and/or at different points in time, governance can be provided by the governing body 102. The governing body 102 can be ICANN (Internet Corporation for Assigned Names and Numbers) or some other entity. The governing body 102 (and/or the protocol provider) can include a namespace governor 126 that governs the @sign namespace, including arbitration of namespace conflicts. The governing body 102 (and/or the protocol provider) can also include a registrar accreditor 128 for accreditation of registrars that can sell and maintain @signs and secondary server configurations.

In some implementations, the protocol provider (e.g., as the protocol provider server 103 or other servers or components) can act as a registrar. Other third party registrars can be supported in some implementations. For example, the registrar servers 110 can provide a registration service 130 that maintains @sign data 132 by performing the registering, provisioning, transferring, renewal, and deletion of @sign handles for users.

An @sign, such as @alice, is a unique identifier assigned to a user of the protocol. An @sign can be referred to as a handle, or an @sign handle, and can be a string of characters (e.g., Unicode characters) uniquely identifying a user and that is registered with a registrar. An @sign can serve as a personal or corporate brand. An expanded Unicode character set can support a wide variety of characters for creative @sign handle creation. Within the system 100, an @sign serves as an address that is resolvable by the root servers 105 to a secondary server endpoint, as described in more detail below.

The root servers 105 are an implementation of a global namespace directory for the system 100. The root servers 105 can store a list of unique identifiers (@signs) along with information for how to reach an @sign server that handles requests for a given @sign. For example, the root servers 105 can store and maintain mappings 137 that map @signs to location information for Internet-accessible user protocol microservices. Location information can be a DNS address plus a port number. The user protocol microservices, referred to herein as @sign servers, @servers, or protocol servers, implement individual, distributed, decentralized resource directories to which protocol requests are routed.

The root servers 105 can provide redirection to the @server for a particular @sign. For example, the root servers 105 can offer a centralized lookup service 140 that provides access to a single @sign namespace. Unlike DNS, the @sign namespace can be implemented without Top Level Domains (TLDs) or subdomains. The lookup service 140 can be intentionally minimal for efficiency, offering just two items of information: 1) whether a particular @sign exists; and 2) if the @sign exists, how the server for the @sign can be reached.

The lookup service 140 can support an @exit verb which can disconnect a connection with a requester. All other inputs to the lookup service 140 can be considered to be @sign lookup requests. Location information for @sign servers can be considered public information so the lookup service 140 can be configured to accept requests without requiring authentication. Users can first query the lookup service 140 for an Internet-addressable location of an @sign server before sending protocol requests to that @sign server.

In response to a lookup query, the lookup service 140 can respond with a null value (or simply ignore a request) if a requested @sign does not exist. If the requested @sign does exist, then the lookup service 140 can return the DNS name or address (e.g., a Fully Qualified Domain Name (FQDN)) of the @server and the IP port number for the requested @sign. If a DOS (Denial Of Service) attack is detected, the lookup service 140 can reduce response time for replying to requests and/or terminate connections or restart the lookup service 140. Other approaches for dealing with DOS attacks can be used. For example, the lookup service 140 can provide the IP address or other identifying information of an entity suspected of a DOS or other attack to upstream (or other) networks or entities, to either slow or delete DOS or other malicious traffic.

TCP ports can be used for scaling @sign server addresses. A TCP port can be used, in general, to identify a service. Port 80 is generally used to identify a web service, for example. Port numbers can generally be a value from 0 to 65535, with only a portion of those values reserved for traditional services. For example, IP version four (IPV4) and IP version six (IPV6) can support port numbers. By using otherwise unassigned or unused port numbers to identify a particular user microservice or @sign server, each unique IP address can be mapped to approximately 65,000 unique microservices, by combining the IP address with a port number. Port numbers thus can allow for scalability at a global scale, since an IP address plus port number scheme can support billions of uniquely-identified microservices.

In general, the root servers 105 can be designed to be cost effectively scaled to handle trillions of requests for billions of records. Root servers 105 can be architected to just provide the single lookup service 140 for the mappings 137, e.g., to include a minimum amount of information for fulfilling lookup requests. In-memory databases and other performance-improving approaches can be used. For example, multiple read-only copies or replicas (e.g., shards) of the mappings 137 can be used, and a given request can be hashed to identify a particular subset database in which to lookup a given @sign. For instance, a first mappings database can hold @signs starting with the letters "a" through "m" and a second mappings database can hold @signs starting the letters "n" through "z." As another example, DNS records for multiple root servers 105 can be used to share an overall load across the multiple root servers 105. For instance, traffic can be routed to a nearest and/or fastest root server 105, or a root server 105 with a lightest current load.

As yet another example, the root servers 105 can be configured so that read-only replicas serve the request load and a main root server 105 serves as the master. The main root server 105 can have a preconfigured DNS address (e.g., root.atsign.org). At least some of the root servers 105, including the master root server, can be configured, operated, and/or provided by the protocol provider. The protocol provider can manage a cluster of root servers, for example. The master root server and/or the protocol provider can maintain IP addresses of the various root servers. In some implementations, third party provider(s) can provide at least some of the read-only replica root servers. In some implementations, a third party representing a particular organization can deploy their own root server(s) for their organization, and maintain internal addressing for their own namespace that may also bridge to the global @sign namespace.

Referring again to the registrar servers 110, the @sign data 132 maintained by the registrar servers 110 can include information for user provisioned @signs. The @sign data 132 can also include information for reserved @signs, such as for countries, states, or @signs that correspond to registered trademarks. When a user deletes (e.g., gives up) an @sign, the registration service 130 can mark the @sign as available to other users or entities. Similarly, the registration service 130 can periodically determine @signs that have not been renewed, and identify the unrenewed @signs as available. Renewal dates can also be included in the @sign data 132. The registration service 130 can periodically determine, in general, which free and/or for-fee @signs are available.

The registrar servers 110 can maintain user contact data 134 for sending renewal reminders or other notices. Financial data 136 can include pricing data for vanity @signs and payment records for @sign purchase transactions. Registrars can store a minimum amount of personally identifiable information (PII), if any. In some implementations, registrars can provide some @sign handles for free and charge a fee for certain (e.g., desirable/vanity) @sign handles.

The registration service 130 can provide a registration application 138 to user devices 107, for example. The registration application 138 can be provided as an application to install on a given user device 107 or as a web site accessed by the user device 107. The registration application 138 can be used by users to provision @signs. For example, a user can use the registration application 138 to search for available @signs, view a list of available @signs, view a list of suggested @signs, check if a format of a desired @sign is valid, and view which vanity @signs are available and at what cost. Once an available @sign has been selected (or entered), the user can use the registration application 138 to register the @sign.

Registration can include providing payment to secure a particular @sign, such as for premium or otherwise desired or likely-to-be desired @signs, which may be associated with a cost. Payment can include, for example, an agreement to and payment of a yearly subscription fee. Payment information and details provided through the registration application 138 can be stored in the financial data 136.

Management and maintenance of @signs can be performed using the registration application 138. For example, users can use the registration application 138 to receive alerts about upcoming @sign renewals (as generated by the registration service 130), pay for a renewal, view a dashboard of assigned @signs and renewal dates, or delete (e.g., give up) an @sign. As another example, the user can use the registration application 138 to select an @sign to sell, set up advertising for the for-sale @sign (to be displayed to other potential users on a registration website, for example), or to transfer an @sign to another entity.

The registration application 138 can also be used to bind (or rebind) an @sign to server information for an @sign server. For example, @sign registration can include mapping the registered @sign to server information for an @sign server that can handle protocol exchanges for the @sign. The server information can be a single IP address (and possible port number) or a FQDN and (possible) port number. Using an IP address or a FQDN/port can have advantages and disadvantages.

For example, if a DNS address is used then the IP address mapped to the DNS address can be changed without changing a root entry. However, DNS can cache data meaning migration to a new IP address for an @sign could take hours or possibly days due to the distributed caching nature of DNS. If an IP address is used as the server information for an @sign an IP address update can be completed more quickly, since protocol guidelines can specify that resolvers or applications may cache IP addresses, for example, for up to 10 minutes. However, if an IP address is mapped directly to an @sign, the IP address for the @sign cannot be changed without contacting the registrar to request an update to a root entry. In some implementations, DNS is preferred over use of IP addresses.

The registrar server 110 can store @sign data for registered and bound @signs in the @sign data 132. The registrar server 110 can send a request to the root server 105 to create a root entry that maps the @sign to the server information for the @sign. In some implementations, @sign to server mapping information is only held in the root servers 105 (and not in the @sign data 132 maintained by the registrar).

Server information for @sign servers can refer to different types of devices and services. Essentially, an @sign server process can run on any device for which an IP address (and possible port number) given by the root server 105 is an Internet-routable address. For example, the protocol server 109 can be a dedicated (e.g., always-on) protocol-enabled device that can handle requests for a particular @sign. The protocol server 109 can execute a user microservice 142 for a particular @sign handle, providing access (based on assigned access rights) to a personal directory 144 that stores information for the @sign handle. The protocol server 109 can be a server device (managed by a third party), a user device (e.g., personal server) that is continuously connected to the network 101, an IoT (Internet of Things) device, or some other protocol-enabled, network-connected device.

As another example, a protocol service can run on a user device 107 (e.g., as implemented by a settings application 145 or another process). Since some user devices may be occasionally offline, the user device 107 can be mapped to a secondary server. The secondary server can be the protocol server 109 or can be a cloud-based user microservice provided, for example by the registrar, the protocol provider, or another entity. Third party providers can agree to comply with protocol guidelines before being allowed to act as a cloud provider for secondary server infrastructure.

As an example of cloud infrastructure, the protocol provider server 103 can provide the user microservices 124 as @sign server processes for users for access to user-specific user containers 122. Similarly, additionally, and/or alternatively, the registrar server 110 can provide user microservices 146 as @sign server processes for users for access to user-specific user containers 148. User containers 122 or 148 may be associated with TLS certificates. The TLS certificates may be associated with, for example, DNS information for the user microservice 124 or 146. The TLS certificates can be used to provide authentication of both server and client connections to the @protocol microservice and to communicated encrypted traffic. A user microservice 124 or 146, with its corresponding user container 122 or 148, respectively, can be uniquely addressable using an assigned IP address and port number, as configured for the associated @sign in a corresponding root server entry.

Container and microservice management, performed by the protocol provider server 103 and/or the registrar server 110, can include management and deployment of user containers, in a multi-tenant container orchestration system. For example, user container management can include starting, stopping, and restoring user containers, deploying a given user microservice 124 or 146 as part of a user activation/registration process, and monitoring health of user containers, including resource allocation and usage, with automatic resource scaling as necessary. User containers can be reconfigured and redeployed in the event of an outage or hardware failure, for example. Data stored in user containers 122 or 148 can be encrypted for security. Decryption keys are discussed in more detail below. Users who choose to use a secondary server implemented as a user microservice 124 or 146 can pay fee(s) (e.g., activation, subscription fees) to the protocol provider or the registrar, respectively, as part of a registration process.

Registration can also include a bootstrapping process in which a secondary server instance is cryptographically bound to a user device 107, such as during activation of the user device 107, using a shared secret. For example, the registration application 138 can present a code (e.g., a QR (Quick Response) code) that includes the shared secret. The user can use the registration application 138 (or a camera application or similar functionality) to scan the code or otherwise retrieve the secret key from the code. The secret key can be stored on the user device 107 in a keys area 150, preferably in a hardware trusted root on the user device 107.

The shared secret can also be provided (e.g., by the registrar server 110) to the secondary server (e.g., microservice) associated with the user's @sign, for storage in the user's personal directory managed by the secondary server. The shared secret can be used by the user device 107 to authenticate to the secondary server. For example, an authentication process can include a key challenge and a challenge response, using the shared secret (e.g., using a CRAM (Challenge Response Authentication Mechanism) process).

In some implementations, the shared secret is used to establish an authenticated connection between the user device 107 and the secondary server during activation and bootstrapping, with activation also including configuration of a public/private key pairing between the user device 107 and the secondary server. The user device 107 can generate a private key (and store the private key in the keys area 150) and a corresponding public key, for sharing with the secondary server, such as by using a RSA (Rivest-Shamir-Adleman) algorithm. Once a public/private key pairing has been established, the shared secret can be removed from the secondary server (and in some cases from the keys area 150). Removal of the shared secret from the secondary server can increase protection of encrypted user data on the secondary server, such as in a scenario where unauthorized access to the secondary server is somehow achieved. The public/private key pairing can be used for post-activation authentications of the user device 107 to the secondary server.

Once the user device 107 is activated and configured, the user device 107 is recorded (e.g., in the @sign data 132) as a registered device for updating data for the @sign handle to which the device 107 is registered. In some implementations, a given user device 107 can be registered as bound to multiple @signs. The user device 107 can store @sign handle(s) 152 for which the user device 107 is registered and corresponding public/private key pairs for each @sign.

The settings application 145 running on the user device 107 can act as a secondary server for a registered @sign handle, receiving and responding to protocol requests locally on the user device. The settings application 145 can provide access to data stored in a personal directory 154 on the user device 107, for example. When the user device 107 is bound to a secondary server, the settings application 145 can synchronize the personal directory 154 with a personal directory stored in the secondary server (e.g., in a user container 122 or 148). When data in the personal directory 154 (or the corresponding personal directory in the secondary server) is updated, a "sync" protocol verb can be automatically invoked that updates the corresponding personal directory, so that user device-based and cloud-based directories are kept synchronized. The user device 107 can be authenticated to the secondary server before a synchronization occurs. The user device 107 can cache secondary server connection information in cached data 156 and/or the user device 107 can obtain secondary server connection information from the root server 105.

Synchronization can include one or more of sending data from one directory to the corresponding directory, comparing received items to stored items, identifying items in the receiver's directory that may need updating, and identifying changes that may have occurred in the receiver's directory that may in turn need updating in the sender's directory. Comparison processing can use metadata that indicates changes, times of changes, etc.

Event-based synchronization for a network-connected user device 107 can ensure that changes occurring in one directory copy are reflected in the corresponding directory copy. If the user device 107 is occasionally offline, the user (and locally-installed applications) can still access the personal directory 154 on the user device 107 and any differences between the personal directory 154 and a secondary server directory copy can be automatically synchronized when the user device 107 comes back online.

If the user device 107 is offline, protocol exchanges can be routed to and handled by the secondary server. In some cases, for protocol exchanges that may require user permission, a notification/permission request can be sent by the secondary server to the user device 107. If the user device 107 is offline, the permission request can be queued and a corresponding application/protocol request can be held until the user device 107 is back online and the user is able to respond to the permission request. In some implementations, the secondary server can be configured to hold a limited number (e.g., one) of permission requests/notifications for the user/user device 107, so as to prevent a bad actor from overflowing the secondary server (or the user device 107) with permission requests or other notifications. As another example, the secondary server can utilize a block list to prevent spamming. Such block lists may be device- or user-specific, or may be used across the entire protocol.

The settings application 145 running on the user device 107 can enable a user of the user device 107 to configure access rights to data stored in the user's personal directory (e.g., in the personal directory 154 and in the mirrored secondary server copy). The user can make certain data public, private, or accessible only to certain users, or any other suitable limitations or restrictions. Other permissions applied to data can include whether data can be copied, shared, or used to derive other data. In general, access rights of various kinds can be granted or revoked using the settings application 145. Access rights can be stored in association with corresponding personal data, such as in the personal directory 154 (and synced with the secondary server copy).

As mentioned, the settings application 145 can serve protocol requests for user data, either from other protocol servers or from an application on the user device 107. In general, the settings application 145, along with the corresponding secondary server, can provide @sign server functionality for the user to enable the user device 107, and the user's @sign, as protocol participants. The settings application 145 can present notifications to the user and enable the user to respond to notifications. Notification responses or other protocol responses can be provided to a sending protocol-enabled participant. Notifications and responses can be sent and received in a P2P fashion, and thus can be free from surveillance by a third party. Notifications can be received by the setting application 145 or the corresponding secondary server automatically, without a need for polling as used in other protocols such as POP3 (Post Office Protocol 3) or IMAP (Internet Message Access Protocol).

In general, an @sign (e.g., protocol) server, whether running on a cloud server, dedicated hardware, or on a user device 107, can provide an addressable endpoint for protocol-based communication. Along with a first, centralized tier of root servers 105, protocol servers can provide a second, decentralized tier of the protocol architecture. While the root servers 105 can be configured to respond to simple @sign lookup requests, the more complex handling of protocol requests for data can be distributed to billions of separate decentralized resource directories (e.g., the protocol servers) that are responsible for responding to the requests. In other words, the protocol servers represent a fully decentralized set of personal service directories, with each protocol server configured to respond to lookup and other requests for a particular @sign. The response for a requested data item or service can come from a secure key/value persistence in the respective decentralized resource directory managed by the protocol server receiving the request.

The protocol request received at a protocol server can include a general syntax pattern of "service@entity" that includes both the data or service requested being included in addition to the entity identifier, with the request being directed to a decentralized resource directory instance for processing. The response data for a particular service@entity request can be stored in a secure key/value persistence for the receiving entity. The value stored for the request can either be stored by value or by reference. The service@entity protocol syntax can be a base for creating Uniform Resource Identifiers (URIs). The service@entity syntax, while forming a simple base pattern, can be extended, such as to include an identity of a requester (e.g., @bob:phone@alice, which can be provided to @bob by @alice in response to a request by @bob for information @alice has shared with @bob).

The decentralized nature of the protocol servers can further increase security. Sensitive data can be stored in, for example, billions of separate, secure decentralized resource directory microservices. Data within a given microservice can be securely stored in an embedded key/value persistence with values strongly encrypted. Accordingly, sensitive data across users is not centralized or stored in one place, which can be security weaknesses for other types of systems. Decentralized distribution of data can support system scaling and can also reduce an attack surface for bad actors to a minimal footprint, as compared to other approaches.

Storing data by reference can further increase data distribution and decentralization. With data being able to be stored either by value or by reference, a user's owned data can be distributed, using by-reference pointers, among various other systems, with access control (including encryption keys) still being stored and managed by the user's protocol server, which remains under the control of the user.

Other than decentralization, various other approaches can be used for securing protocol requests and secured data when implementing the @protocol. For example, secure transport channels, such as TLS over TCP/IP, can be used. As another example, connections can be validated, by servers and/or clients, using SSL certificates. For further security, different protocol messages can be hashed and/or encrypted. Personal data can be encrypted and/or signed cryptographically, and can be decrypted by requesting and obtaining, for example, a public key of the entity. Other examples include use of a blacklist. A blacklist is a list of @signs that is checked when a "from:" verb is received by a protocol server. If the sender of the from: verb is found in the blacklist, the connection is immediately dropped, for example to fulfill a protocol promise of preventing a known blocked @sign from having any interaction whatsoever with the protocol server apart from a public lookup (e.g., which does not use the from: verb). In addition to a blacklist, "allowed list(s)" or "whitelist(s)" can be maintained by a protocol server that are derived from shared data and include @signs to whom the shared data is shared.

Additionally, the protocol servers are designed to prevent outside surveillance. Data stored in a protocol server can only be accessed by the registrant and other users to which the registrant user has explicitly shared access. The protocol servers are specifically designed to control the granting or revoking of access rights to registrant's data and services in real-time, based on the user's permissions. Other tracking or access to a protocol server outside the protocol specification can be prohibited, even from the registrar server 110, the protocol provider server 103, or other components of the system 100.

The personalized decentralized resource directories provided by the various protocol servers can enable various types of applications, including P2P applications. For example, a user device 107 can include various protocol-enabled applications 158. The protocol-enabled applications 158, which can include installed and/or web-based applications, can retrieve an @handle from the settings application 145, request approval for access to data in the personal directory 154, and expose application data 160 to the settings application 145 (or the secondary server) for the user's protocol server to maintain permissions for the application data 160. Although shown separately from the personal directory 154, application data 160 can be stored in the personal directory 154 or linked from the personal directory 154.

In some implementations, a protocol-enabled application 158 (and/or the settings application 145) includes a resolver library which can make protocol requests on behalf of the protocol-enabled application 158. Protocol-enabled applications 158, through use of the resolver library and/or the settings application 145, can be configured to receive user input, translate user input into protocol commands, process protocol verb requests, provide protocol verb responses, and persist data. Data persisted by an application can be data shared by others, and can be stored in the application data 160, the personal directory 154 and/or the cached data 156. Data shared by others can have a TTL (Time to Live) setting, which limits how long the data from others may be accessible.

Data in the personal directory 154, the personal directory 144, or in secondary server personal directory copies can also have a TTL setting. As described below, a private lookup challenge value can be placed in a personalized directory with a TTL value. As another example, application and/or personalized directory data can have a "TTB" (e.g., Time unTil Birth, Time To Birth) setting, which can represent a duration value. Data with a TTB setting can be configured to become available in the application data or personalized directory after the duration has elapsed (e.g., sharing information with a TTB parameter can provide access to the information only after the TTB time has been reached). For example, important financial information might be stored in an @server that is to become accessible only at a defined time in the future for all recipients. The financial information can be public or private and might also be subject to other time based controls, such as TTL and TTR (Time To Refresh). For instance, data can have both a TTB and a TTL setting, which can result in a data item appearing after a TTB duration has expired, and disappearing after a TTL duration has expired. Data with a TTR setting can be refreshed when the interval value for the TTR setting is reached. TTL, TTB, and TTR settings, whether used separately or in combination(s), can enable flexible and powerful data access and privacy control capabilities.

Applications can present data in a GUI (Graphical User Interface) 162. As another example, the protocol-enabled applications 158 can include a shell application, in which a user can enter protocol commands, e.g., after connecting to a root server 105, or a protocol server. The user can enter anonymous commands to access publicly available information, and can authenticate to a given protocol server, to make an authenticated request for information.

A protocol-enabled application 158 can be a standalone application for managing personal data, or can be a P2P application that communicates with other P2P applications, over the network 101. End-to-end encrypted P2P applications can have an advantage of not being subject to surveillance as they do not need to communicate through backend servers, or send unencrypted information in the clear. Rather, P2P applications can communicate in a distributed fashion, directly between themselves, at the edge of the network 101.

The protocol provider can support the application developer community, by providing the source code distribution 114 and the documentation distribution 116. The source code distribution 114 can be an open source code repository, e.g., for reference implementations, and can be made available from the protocol provider server 103 (or another server of the protocol provider) or through another source code repository or channel. The source code distribution 114 can include code for a SDK (Software Development Kit) that can be used by application developers 104 to create protocol-enabled applications. Other source code examples include sample code for protocol exchanges, code for fully-developed sample applications, etc.

The documentation distribution 116 can include protocol specification information and documentation, discussion of example protocol exchanges, tutorials, or other types of documentation. In addition to source code and documentation, the protocol provider can provide binary distributions for development tools, sample applications, etc. In general, an overall repository managed or supported by the protocol provider can include items that can be used, tested, evaluated, contributed to, and extended, by the application developer community.

Application developers 104 can use developer tools 164 provided by the protocol provider (or by other providers) to develop protocol-enabled applications. Application developers 104, in order to use the protocol, can first agree to terms of conduct published by the protocol provider, which can provide legal recourse. Application developers can review application certification guidelines included in the documentation distribution 116, to learn requirements for application certification. When an application is ready for certification, an application developer 104 can provide application code 166 (or another type of packaged application distribution) to the application certifier 118, for certification.

Application certification can include review and testing (e.g., by the application certifier 118 or by administrator(s)) of the application code 166, to check for compliance with protocol guidelines. Upon successful certification of an application, application certification information 119 can be stored for the certified application. As another example, certification information can be stored at an @sign server associated with the application. In some implementations, application certification can be validated in real time, such as by using a checksum validation. Upon receiving an application certification result, an application developer 104 (or the application certifier 118) may update code of the application so that, for example, a user interface of the application presents an indication of certification to a user.

As another example, application information stored for the application in an application repository 168 of the application store 108 can be updated so that prospective users can see the certification status of the application. A user device 107 can connect to an application store service 170 (e.g., using a web site or an installed application provided by the application store 108), to access various application discovery tools. For example, a user can use the application store service 170 to browse and/or search for protocol-enabled applications. As another example, the application store service 170 can provide application ratings and/or recommendations. Once a user selects an application, the application can be downloaded (e.g., to a user device 107) from the application repository 168. The application store 108 can be provided by or otherwise affiliated with the protocol provider. As another example, at least some other application stores can be provided by third party vendors.

In some implementations, the backup server 106 is included in the system 100, as a separate backup repository for protocol servers. For example, a backup service 171 can provide backup/restore access to personal directory backups 172. The personal directory backups 172 can hold non-key data, for example. In some implementations, backup services can be provided by secondary server providers (e.g., data may be backed up in the user containers 122 or 148). If a user chooses to use the backup server 106 or another backup mechanism, the user can be charged a fee for the backup services.

In some implementations, the enterprise user device 111 can be connected over the local area network 112 with the enterprise microservice server 113 that can act as a proxy for the enterprise user device 111 for network connectivity beyond the local area network 112. The enterprise user device 111 may be behind a corporate or other type of firewall, for example. The enterprise user device 111 can send a "plookup" (e.g., a proxied lookup) protocol verb to the enterprise microservice server 113, for protocol exchanges. Through use of the plookup verb, the enterprise microservice server 113 can contact other protocol servers for protocol exchanges to be performed on behalf of the enterprise user device 111. The enterprise microservice server 113 can be useful in large enterprise environments that prefer all lookups going through a single Internet-connected secondary server, or where only a single port (e.g., on the enterprise microservice server 113) is preferred to be opened through the firewall for protocol use, or for other cases where a minimizing of connections is desired. The enterprise microservice server 113 can support an internal, private @protocol system (that includes the enterprise user device 111 and other devices), that is located internally within the enterprise.

As used in the present disclosure, the term "computer" is intended to encompass any suitable processing device. Indeed, the illustrated devices and systems may be or include any computer or processing device such as, for example, a mobile device, a laptop, a blade server, a general-purpose personal computer (PC), Mac®, workstation, UNIX-based workstation, IoT device, or any other suitable device. In other words, the present disclosure contemplates computers other than general purpose computers, as well as computers without conventional operating systems. Further, the illustrated devices and systems may be adapted to execute any operating system, including Linux, UNIX, Windows, Mac OS®, Java™, Android™, iOS, Dart, Swift, Kotlin, or any other suitable operating system.

Interfaces 175, 176, 177, 178, 179, 180, 181, 182, 183 and 184 (referred to below as interfaces 175-184) are used by the governing body 102, the protocol provider server 103, the application developers 104, the root servers 105, the backup servers 106, the user devices 107, the application store 108, the protocol servers 109, the registrar servers 110, and the enterprise microservice server 113, respectively, for communicating with other systems in a distributed environment—including within the system 100—connected to the network 101. Additionally, the interface 185 enables the enterprise user device 111 to communicate on the LAN 112 (e.g., to other enterprise user devices 111 and/or to the enterprise microservice server 113. Generally, the interfaces 175-184 each comprise logic encoded in software and/or hardware in a suitable combination and operable to communicate with the network 101. More specifically, the interfaces 175-184 may each comprise software supporting one or more communication protocols associated with communications such that the network 101 or interface's hardware is operable to communicate physical signals within and outside of the illustrated system 100.

The protocol provider server 103, the root servers 105, the backup servers 106, the user devices 107, the protocol servers 109, and the registrar servers 110 may each respectively include one or more processors 186, 187, 188, 189, 190, or 191. Each processor 186, 187, 188, 189, 190, or 191 may be a central processing unit (CPU), a blade, an application specific integrated circuit (ASIC), a field-programmable gate array (FPGA), or another suitable component. Generally, each processor 186, 187, 188, 189, 190, or 191 executes instructions and manipulates data to perform the operations of the respective device. Specifically, each processor 186, 187, 188, 189, 190, or 191 executes the functionality required to receive and respond to requests from another device. Although not illustrated as including processors, the governing body 102, the application developer 104, the application store 108, the enterprise user device 111, and the enterprise microservice server 113 may each include (or be associated with device(s) that include) one or more processors.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, Dart, Swift, Kotlin, Go, Python, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Each of the devices or systems illustrated in FIG. 1 may include one or more memories (e.g., storage locations). Each memory may include any type of memory or database module and may take the form of volatile and/or non-volatile memory including, without limitation, magnetic media, optical media, random access memory (RAM), read-only memory (ROM), removable media, or any other suitable local or remote memory component. Each memory may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the system 100.

The user devices 107 may each generally be any computing device operable to connect to or communicate with other devices using a wireline or wireless connection, with different user devices 107 being similar or different types of devices in a particular implementation. In general, the user device 107 comprises an electronic computer device operable to receive, transmit, process, and store any appropriate data associated with the system 100 of FIG. 1. The user device 107 can each include one or more client applications, including the registration application 138, the settings application 145, and the protocol-enabled applications 158. A client application is any type of application that allows the user device 107 to request and view content on user device 107. In some instances, a client application may be an agent or client-side version of the one or more server applications running on a server.

The user device 107 is generally intended to encompass any client computing device such as a laptop/notebook computer, wireless data port, smart phone, personal data assistant (PDA), tablet computing device, one or more processors within these devices, or any other suitable processing device. For example, the user device 107 may comprise a computer that includes an input device, such as a keypad, touch screen, or other device that can accept user information, and an output device that conveys information associated with the operation of the client device itself or the system 100, including digital data, visual information, or the GUI 162.

The GUI 162 interfaces with at least a portion of the system 100 for any suitable purpose, including generating a visual representation of the registration application 138, the settings application 145, or the protocol-enabled applications 158. In particular, the GUI 162 may be used to view and navigate various Web pages. Generally, the GUI 162 provides a respective user with an efficient and user-friendly presentation of data provided by or communicated within the system 100. The GUI 162 may comprise a plurality of customizable frames or views having interactive fields, pull-down lists, and buttons operated by the user. The GUI 162 contemplates any suitable graphical user interface, such as a combination of a generic web browser, intelligent engine, and command line interface (CLI) that processes information and efficiently presents the results to the user visually.

There may be any number of user devices 107 associated with, or external to, the system 100. Additionally, there may also be one or more additional user devices 107 external to the illustrated portion of system 100 that are capable of interacting with the system 100 via the network 101. Further, the term "client", "client device" and "user" may be used interchangeably as appropriate without departing from the scope of this disclosure.

Figure 2:
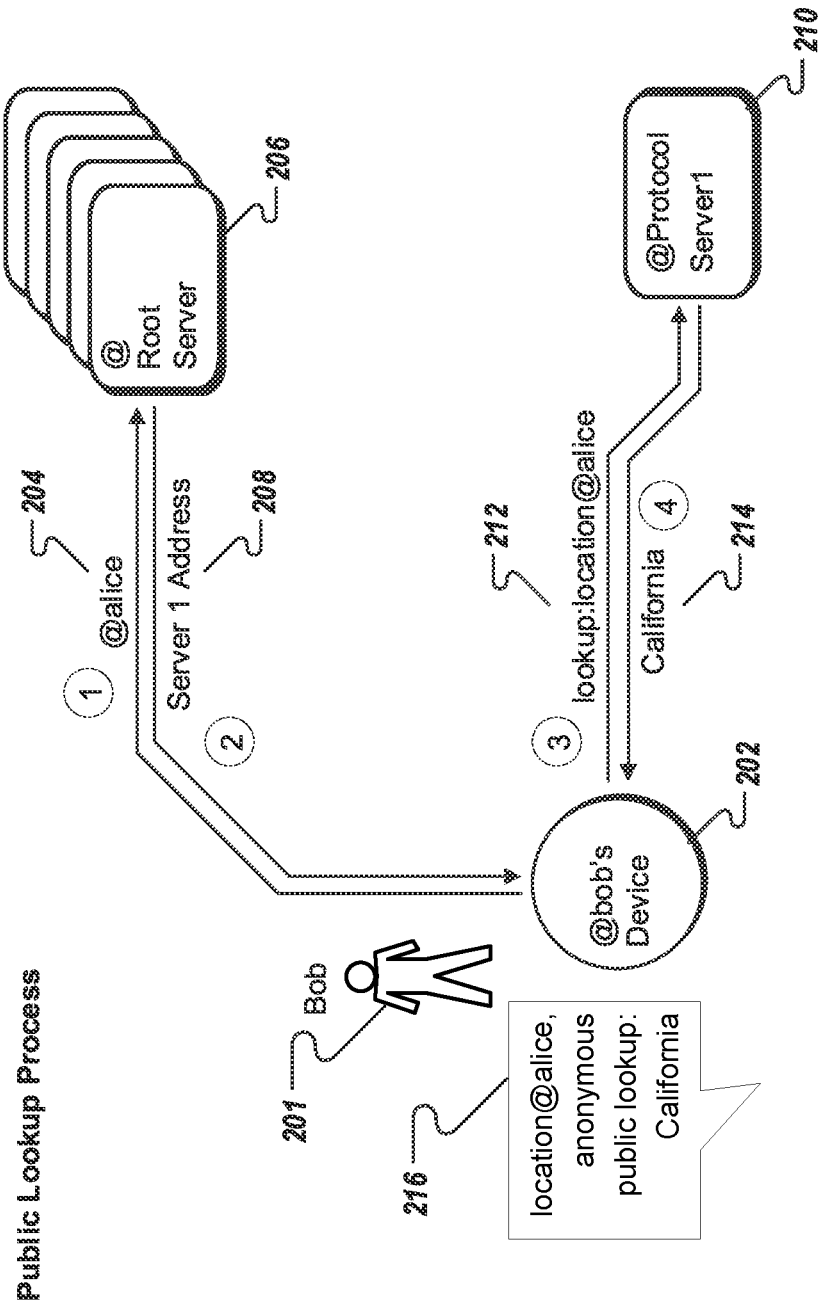
FIG. 2 is a block diagram illustrating an example system for a public lookup transaction.

FIG. 2 is a block diagram illustrating an example system 200 for a public lookup transaction. A public lookup can be performed on an @sign server without being authenticated to the @sign server. In this example, a user 201 ("Bob") wants to do a lookup for a location value for an @alice user. The user 201 can perform the lookup using a device 202 (e.g., Bob's device, configured for or associated with an @bob user). The device 202 can include code for executing @protocol exchanges (e.g., as provided by a resolver library), among other protocol configurations.

In a first stage (e.g., illustrated as a circled "one"), the device 202 sends an "@alice" query 204 to a root server 206. A public lookup of an @sign can be performed without being authenticated to the root server 206. The root server 206 looks up server information for the @alice handle and, in stage two, returns server address information 208 to the device 202. The server address information 208 can include a server address and port number for a protocol server 210 that handles protocol requests for the @alice user.

In a third stage, the device 202 uses the server address information 208 to send a "lookup:location@alice" query 212 to the protocol server 210. The protocol server 210 can determine whether a "location" value is stored by the protocol server 210 and whether the location value is publicly accessible. The query 212 is an anonymous, unauthenticated (e.g., public) query, so the protocol server 210 can be configured to provide a response to the query 212 only if the protocol server 210 stores a public "location" value. In some implementations, if the protocol server 210 does not store a public location value, the protocol server 210 can provide a null (e.g., empty) response. Alternatively, if no public location value is stored, then the protocol server 210 can ignore the location@alice query 212 with no response provided.

In a fourth stage, in response to determining that a public location value is stored at the protocol server 210, the protocol server 210 sends a retrieved public location value of "California" to the device 202. A note 216 summarizes the transaction (i.e., the device 202 receiving the public location value of "California" 214 in response to the public-lookup "location@alice" query 212).

The lookup:location@alice query 212 is an example of a lookup protocol verb used to lookup a particular address in a particular @handle's namespace. The protocol server 210 can be configured to assume that any received value that ends with "@alice" is a lookup request, for example. As mentioned, an unauthenticated request is referred to as a public lookup, in which a requesting user does not have to prove who they are. Private, authenticated lookups are also supported, as described below.

Figure 3:
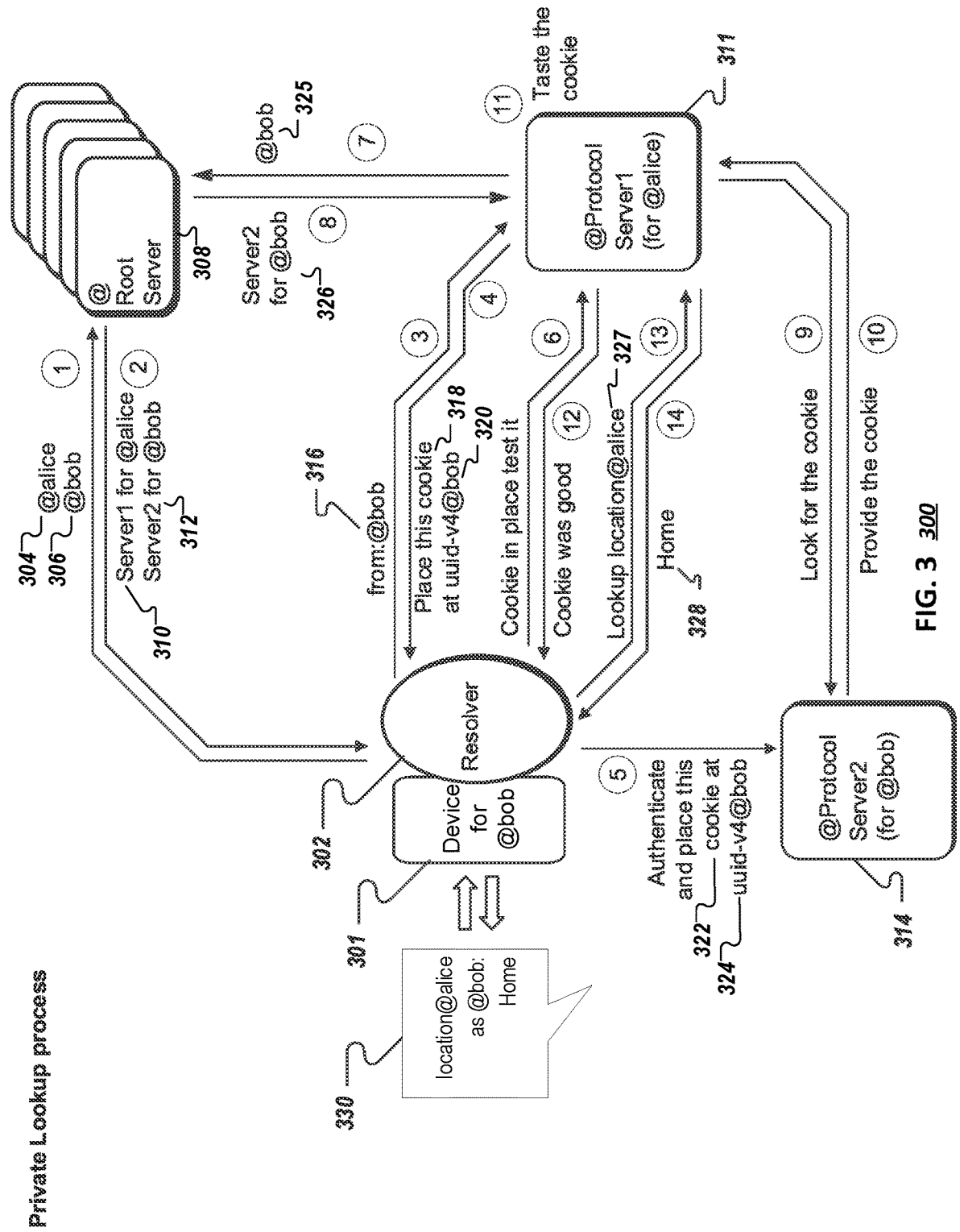
FIG. 3 is a block diagram illustrating an example system for a private lookup transaction.

FIG. 3 is a block diagram illustrating an example system 300 for a private lookup transaction. The @protocol includes an automated method for ensuring that an entity that is requesting some private information from another entity has proven that they are who they claim to be before the request is presented for processing. Failure of this proof can immediately cause the connection between the entities to be dropped. A "proof of life" or "pol" algorithm can be performed during a private lookup process.

A device 301, associated here with user @bob, can include a resolver 302. The resolver 302 can be a library included in (or otherwise used by) a protocol-enabled application. The resolver 302 can be configured to perform (among other tasks) a private lookup of information managed by a user with a handle of @alice. The resolver 302 can be included in an application that is running on the device 301 on behalf of the user @bob.

In a first stage, the resolver 302 sends an "@alice" query 304 and an "@bob" query 306 to a root server 308. The resolver 302 may or may not currently have access to server information for a protocol server for @bob, for example. To perform the pol algorithm as part of a private lookup for information managed by the @alice user, the resolver 302 can connect to protocol servers for both @alice and @bob.

In response to the @alice query 304 and the @bob query 306, the root server 308 looks up server information for the @alice and @bob handles and, in a second stage, returns, to the resolver 302, server address information 310 for a protocol server 311 for @alice and server address information 312 for a protocol server 314 for @bob, respectively.

In a third stage, the resolver 302 submits a "from:@bob" request 316 to the protocol server 311. The "from:@bob" request 316 is an example use of a from protocol verb that can be used to tell a protocol server what @handle is associated with a request. The pol algorithm can be initiated when a user submits a from verb that includes an @sign of the requester. The "from:@bob" request 316 includes the @sign "@bob" in this example.

In the pol algorithm, upon receiving a "from" request, the requested entity first returns a challenge asking the requestor to publish a defined secret in a defined secret location in the requestor's namespace and notify the requested entity when the defined secret is available at the defined location. For example, in a fourth stage, the protocol server 311, in response to the request 316, sends a challenge requesting the resolver 302 to place a cookie 318 at a particular address 320 on the protocol server 314. That is, proof of a requester's identity can be provided using an ability to place a cookie or other identifier at a specified place in the requester's @handle name space. For the resolver 302 to legitimately act on behalf of @bob, the resolver 302 should be able to authenticate to the protocol server 314 for @bob and place the requested cookie 318 at the requested address 320. The cookie 318 and the address 320 can be randomly-generated values generated by the protocol server 311 as part of the pol algorithm. The cookie 318 and the address 320 can be UUIDs (Universally Unique IDentifiers) or some other type of random value or identifier.

In a fifth stage, the resolver 302 authenticates to the protocol server 314 for @bob and places a cookie 322 (corresponding to the requested cookie 318) at an address 324 (corresponding to the requested address 320). The resolver 302 authenticates to the protocol server 314 before performing the placement of the cookie 322. Different approaches can be used for authenticating to the protocol server 314.

For example, the resolver 302 can first indicate to the protocol server 314 that the resolver 302 is acting on behalf of the @bob user (e.g., using a "from:@bob" command). The protocol server 314 can respond with a challenge for the resolver 302. The resolver 302 can respond to the challenge, using for example, a CRAM verb or a PKAM (Public Key Authentication Mechanism) verb. The CRAM verb uses a shared secret, while the PKAM verb uses a public/private key approach. Authentication is discussed in more detail below with respect to FIG. 4A.

After successfully authenticating to the protocol server 314, the resolver 302 can submit an update request to the protocol server 314 to place the cookie 322 at the address 324. An update verb can be used to place a new value or update an existing value on the protocol server 314, for example. Placing the cookie 322 at the address 324 can prove to the protocol server 311 that the resolver 302 is in fact acting on behalf of the @bob user.

In a sixth stage, the resolver 302 sends an indication to the protocol server 311 that the requested cookie is in place on the protocol server 314 and available for testing by the protocol server 311. For example, the resolver 302 can send a pol verb to the protocol server 311. The pol verb can be used to signal the protocol server 311 to check for (e.g., look up) the cookie 318 on the protocol server 314.

In a seventh stage, the protocol server 311 sends an "@bob" query 325 to the root server 308 (or to another root server) requesting protocol server information for the @bob handle.

In response to the @bob query 325, the root server 308 looks up server information for the @bob handle and, in an eighth stage, returns, to the protocol server 311, server address information 326 for the protocol server 314 for @bob.

In a ninth stage, the protocol server 311 looks for the cookie 318 at the address 320 on the protocol server 314. Looking for the cookie can include sending a lookup request for a value on the protocol server 314 at the address 320.

In a tenth stage, the protocol server 314 provides the cookie value 322 stored at the address 324 to the protocol server 311, in response to the lookup request sent by the protocol server 311.

In an eleventh stage, the protocol server 311 "tastes" the cookie received from the protocol server 314. That is, the protocol server 311 compares the cookie 318 sent in the proof challenge to the cookie 322 that was actually stored at the address 320 on the protocol server 314 (and sent to the protocol server 311 by the protocol server 314). If the cookie 318 does not match the cookie 322, the protocol server 311 can determine that the resolver 302 has failed the proof of life challenge. The protocol server 311 can drop a connection with the resolver 302, simply not respond to the pol verb sent by the resolver 302 in the sixth stage, or return an error code to the resolver 302 that indicates a failure of the pol attempt. Similarly, the protocol server 311 can drop a connection, ignore the pol verb, or send an error code to the resolver 302 if the cookie 318 was simply not found on the protocol server 314.

In a twelfth stage, in response to a successful retrieval and test of the cookie 322, the protocol server 311 sends an indication of pol success to the resolver 302, indicating that the resolver 302 has successfully authenticated to the protocol server 311 as the user @bob.

In a thirteenth stage, the resolver 302 sends, using the authenticated connection, a "lookup location@alice" request 327 to the protocol server 311. The protocol server 311 can determine that a value specific to @bob is stored by the protocol server 311 for the location@alice address.

In a fourteenth stage, the protocol server 311 returns a value of "Home" 328 to the resolver 302, in response to the lookup request 327. A note 330 summarizes the private lookup transaction, of the resolver 302 receiving the location value of "Home" 328, in response to the private (e.g., as @bob) lookup "location@alice" request 327. That is, the value of "Home" has been shared with the @bob user and is provided in response to location@alice requests sent by the @bob user or an application acting on behalf of @bob, in contrast to a publicly accessible location value 214 of "California" that is returned in response to location@alice requests sent by unauthorized users (or by users to which a private/custom location value is not shared).

Figure 4A:
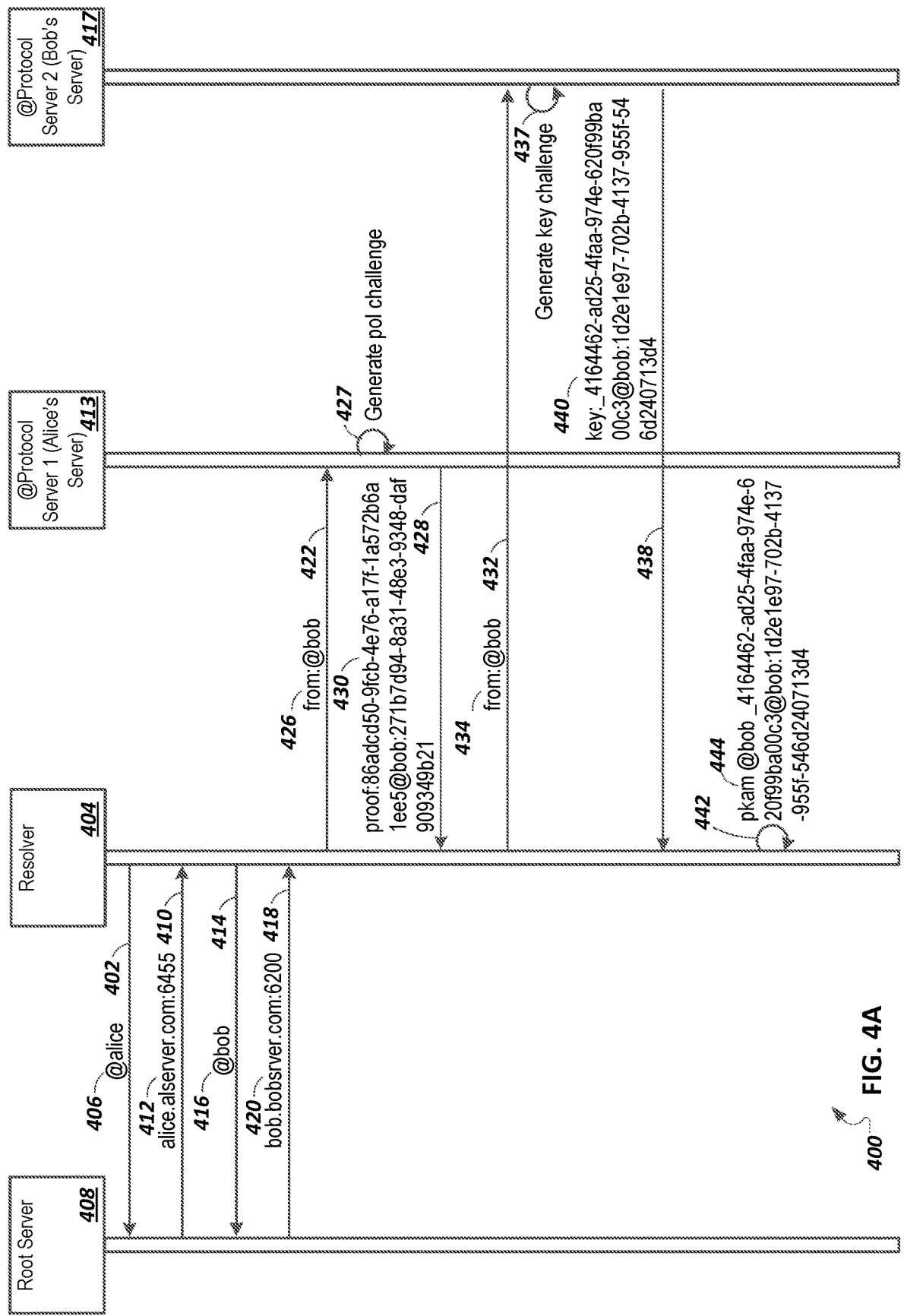
FIGS. 4A and 4B are a combined swim lane diagram illustrating an example method for a private lookup transaction.
Figure 4B:
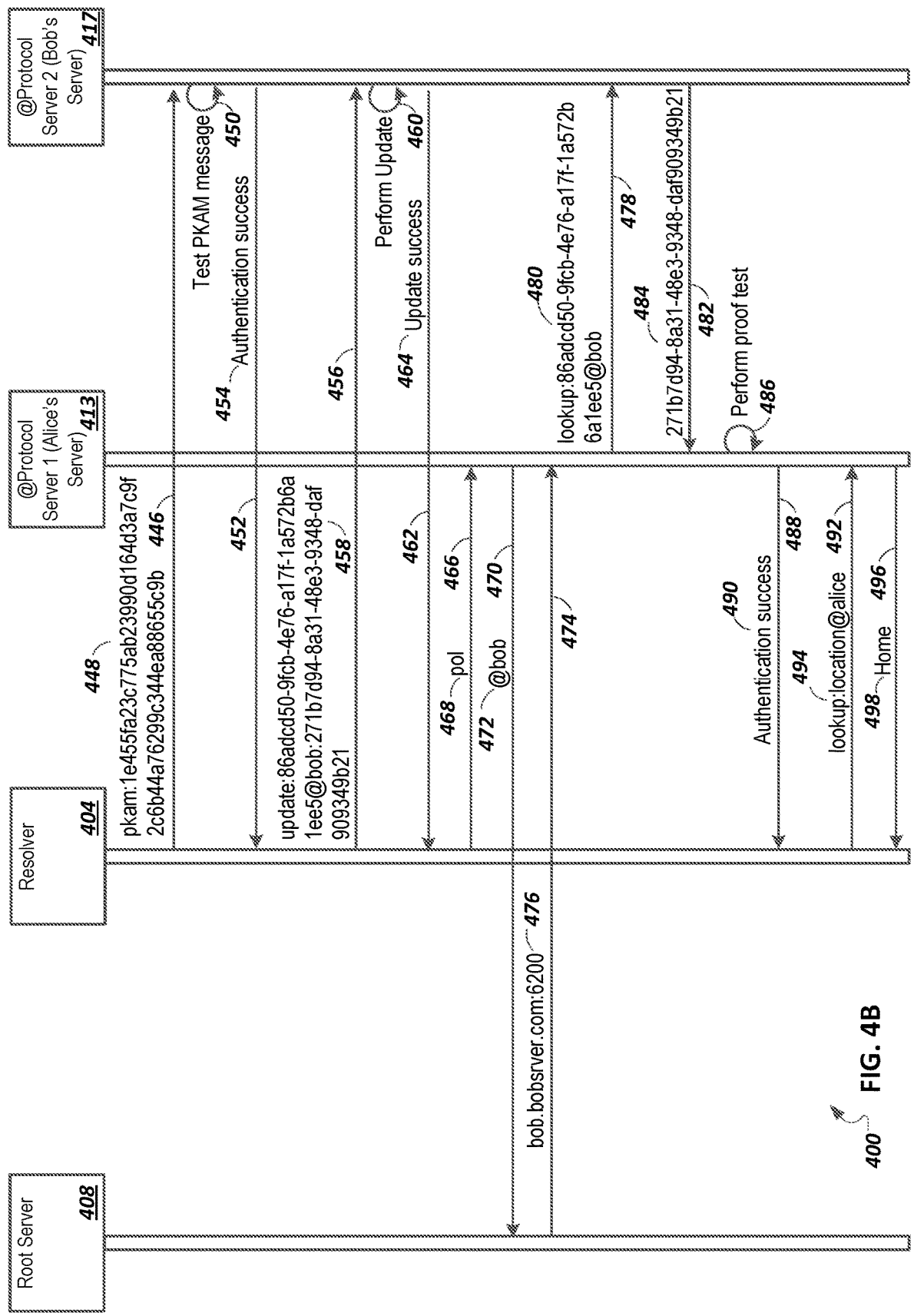

FIGS. 4A and 4B are a combined swim lane diagram illustrating an example method 400 for a private lookup transaction. Similar to the private lookup illustrated in FIG. 3, the method 400 can describe a user "Bob" with a handle of "@bob" performing a private lookup of information maintained by a user "Alice" with a handle of "alice."

As shown in FIG. 4A at 402, a resolver 404 sends a query 406 of "@alice" to a root server 408. At 410, the root server 408 sends a response 412 to the query 406 of "alice.alserver.com:6455" that includes a server and port number of Alice's server 413. Bob can use an application that includes, implements, or accesses the resolver 404 to submit a query for Alice's server information, if Bob (or the application) does not have Alice's server information cached. If Bob (or Bob's application) does not have his own server information cached, the resolver 404 can, at 414, send a query 416 of "@bob" to the root server 408 to obtain server information for Bob's server 417. For example, at 418, the root server 408 sends a response 420 of "bob.bobserver.com:6200" in response to the query 414.

In general, the root server 408 can respond to a query for an @sign with a single IP address and port or a single fully qualified domain name (FQDN) and port number. The returned port number can identify the @protocol service and a particular user's server. The root server 408 can respond with a null value (or simply ignore a request) if the root server 408 does not have server information for a particular requested @sign.

At 422, the resolver 404 connects to Alice's server 413 and sends a "from:@bob" message 426 to Alice's server 413. As discussed above, a "from" request can indicate to a requested entity what @handle the requester claims to be. The message 426 can indicate to Alice's server 413 that the resolver 404 is claiming to be associated with the @bob user.

At 427, in response to the message 426, Alice's server 413 generates pol challenge information. For example, Alice's server 413 can generate a first random value and a second random value to be used in a challenge sent to the resolver 404.

At 428, Alice's server 413 responds to the message 426 by sending a pol challenge 430. The pol challenge 430 is a proof challenge that requests the resolver 404 to place a first identifier (e.g., a UUID) "271b7d94-8a31-48e3-9348-da1909349b21" at a randomly-generated address of "86adcd50-9fcb-4e76-a17f-1a572b6a1ee5" on Bob's server 417. If the resolver 404 is authorized to act on behalf of @bob, the resolver 404 should be able to successfully perform the requested challenge.

At 432, the resolver 404 sends a "from:@bob" message 434 to Bob's server 417 to attempt to authenticate to Bob's server 417. Similar to the message 426, the message 434 is indicating to Bob's server 417 that the resolver 404 is claiming to be acting on behalf of the @bob user.

At 437, Bob's server 417 generates key challenge information.

At 438, Bob's server 417 sends a key challenge 440 to the resolver 404. As shown, if a user, application, or process issues a "from:@bob" verb to the server associated with the @bob user, the server for @bob can issue a key challenge, whereas the server for @bob can issue a proof challenge in response to a from: verb from a user other than the @bob user. As discussed above, the resolver 404 can respond to the key challenge 440 using a CRAM verb, a PKAM verb, or some other type of authentication response.

At 442, the resolver 404 (or another process, on behalf of the resolver 404) executes a PKAM command 444 to create a signed version of the key challenge 440 using a private key for the @bob user. If the resolver 404 is legitimately configured to represent the @bob user, the resolver 404 has access to the private key for the @bob user. With the PKAM approach, Bob's server 417 is configured to have access to the public key for the @bob user.

Referring now to FIG. 4B, at 446, the resolver 404 sends a PKAM message 448 to Bob's server 417. The PKAM message 448 includes a signed version of the key challenge 440 that was created by the PKAM command 444.

At 450, Bob's server 417 tests the PKAM message 448. For example, Bob's server 417 can check to see if the signed version of the key challenge 440 is accurate by testing the signed version of the key challenge 440 using the public key for the @bob user.

At 452, in response to a successful test of the PKAM message 448, Bob's server 417 sends an indication 454 of authentication success to the resolver 404.

At 456, the resolver 404 sends, while authenticated on Bob's server 417 as @bob, an update request 458 to Bob's server 417 to place the first random value "271b7d94-8a31-48e3-9348-daf909349b21" included in the pol challenge 430 at the randomly-generated address of "86adcd50-9fcb-4e76-a17f-1a572b6a1ee5 included in the pol challenge 430.

The update protocol verb enables a user or process authenticated on a given @sign server to update entries in that @sign namespace. A general format of the payload for an update verb is: [public/@sign]:key@[@yourname] value. An example update request is "update:public:email@alice alice.bloggs@emailXXX.com," which can create a public record for an email@alice address with a value of "alice.bloggs@emailXXX.com." An example of updating a value shared to a certain user is "update:@bob:email@alice alice@personalemail.org." A delete verb can be used by an authenticated user or process to delete an entry on an @sign server. For example, "delete:public:email@alice" and "delete:@bob:email@alice" requests can be sent to delete the entries mentioned in the previous two examples.

Continuing with FIG. 4B, at 460, Bob's server 417 performs an update of Bob's personal directory based on the update request 458. In some implementations, a cookie placed on Bob's server based on the update request 458 is configured with a timeout value. For example, the cookie can have a TTL (Time To Live) value set to one minute. After one minute has passed, Bob's server 417 can delete the cookie (or mark the cookie as invalid). A timeout value, combined with generation of random values such as UUIDs, can result in a negligible likelihood of a namespace clash (e.g., of another application or user placing a same cookie value at a same location). From a perspective of other entities other than the resolver 404 and Bob's server 417, the update request 458 essentially results in the placing of an unknowable value at an unknowable location. A likelihood of another user or application knowing (or learning) the random cookie value or the random location can be substantially negligible. In some implementations, Bob's server encrypts the cookie using a private key associated with the @bob user before placing an encrypted cookie at the address requested by Alice's server 413. Alice's server 413 can decrypt the encrypted cookie, as described below.

At 462, Bob's server 417 sends an indication 464 of a successful update to the resolver 404. At 466, the resolver 404 sends a pol request 468 to Alice's server 413. The pol request 468 can be used to signal Alice's server 413 that Bob's server 417 is ready for Alice's server 413 to verify the pol challenge 430.

At 470, Alice's server 413 sends a query 472 of "@bob" to the root server 408 to obtain server information for Bob's server 417. At 474, the root server 408 sends a response 476 of "bob.bobserver.com:6200" in response to the query 472.

At 478, Alice's server 413 sends a lookup request 480 to Bob's server 417 to look up the value at the address Alice's server included in the pol challenge 430.

At 482, Bob's server 417 sends a value 484 to Alice's server 413 in response to the lookup request 480. The value 484 is retrieved by Bob's server 417 as the value of the 86adcd50-9fcb-4e76-a17f-1a572b6a1ee5@bob address on Bob's server 417.

At 486, Alice's server 413 performs a proof test. Alice's server 413 can compare the value 484 to the value Alice's server 413 included in the pol challenge 430. In implementations in which Bob's server 417 encrypts the value Alice's server 413 included in the pol challenge 430, before storing an encrypted value on Bob's server 417, Alice's server 413 can decrypt the encrypted value using a public key for the @bob user, before comparing a decrypted value to the value included in the pol challenge 430. Alice's server 413 can obtain the public key for @bob by doing a lookup for publickey@bob, for example.

At 488, in response to a successful proof test, Alice's server 413 sends an indication 490 of authentication success to the resolver 404. The resolver 404 is now authenticated as the @bob user on Alice's server 413. Alice's server 413 has concluded that the resolver 404 is in fact acting on behalf of the @bob user as claimed by the resolver in the "from:@bob" message 426.

At 492, the resolver 404, while in an authenticated state with respect to Alice's server 413, sends an authenticated lookup request 494 to Alice's server 413.

At 496, Alice's server 413 sends a user-specific value 498 to the resolver 404, in response to the authenticated lookup request 494. The user-specific value 498 is an example of a polymorphic response. Alice's server can send different values in response to a same lookup location@alice request, based on whether the sender is anonymous or based on the identity of the sender.

Figure 5:
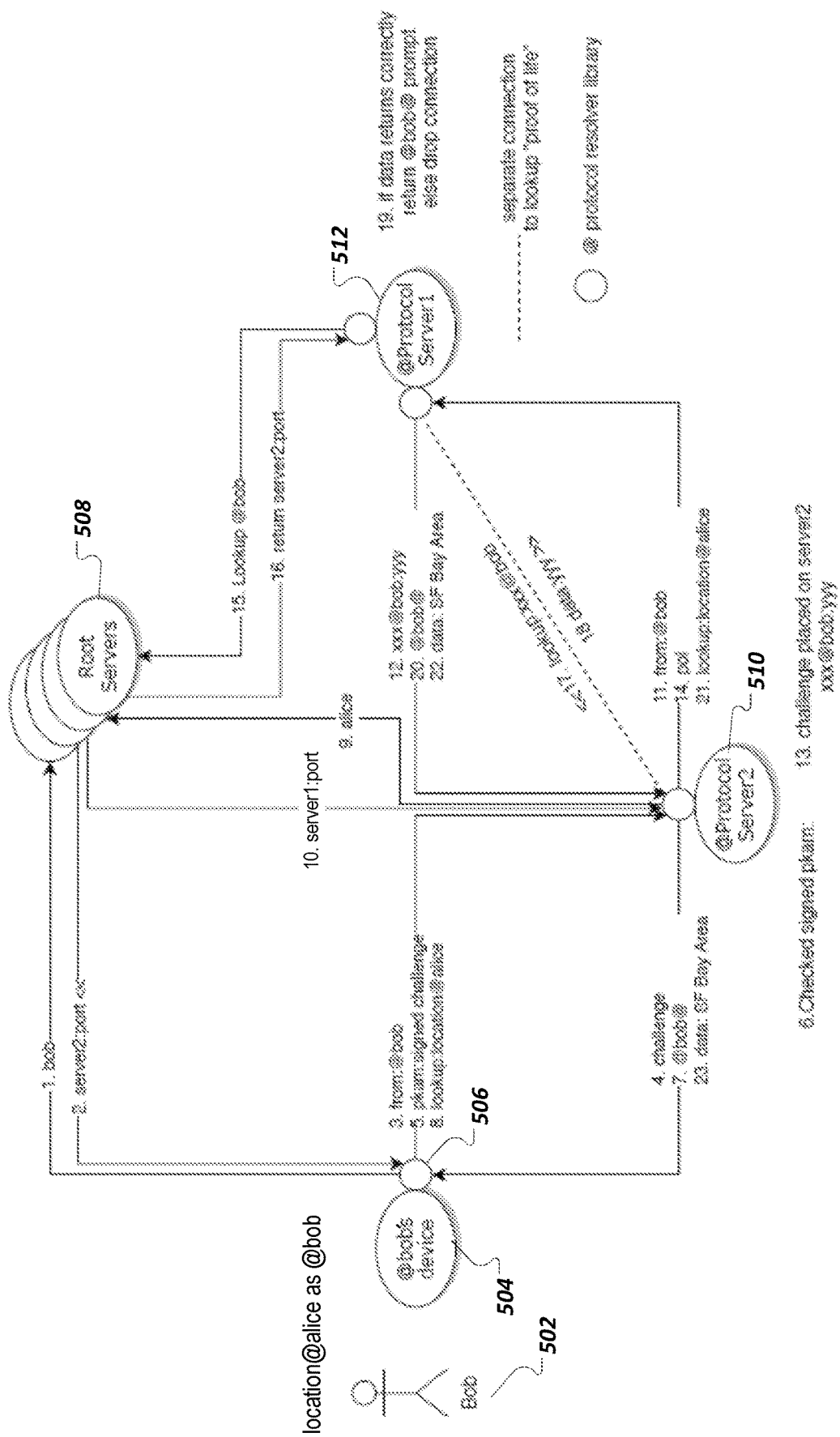
FIG. 5 is a block diagram illustrating an example system for a private lookup transaction.

FIG. 5 is a block diagram illustrating an example system 500 for a private lookup transaction. The system 500 is similar to the system 300, but the system 500 includes a different approach performed by a user's protocol server in contacting another protocol server on behalf of the user (or the user's application). In the example of FIG. 5, a user Bob 502 with a handle of @bob uses a device 504 to initiate an authenticated lookup of a location@alice address.

In a first stage (e.g., denoted with a "1."), a resolver 506 on the device 504 sends a query of "bob" to a root server 508, to obtain server information for a protocol server for the @bob handle. In a second stage, the root server 508 returns server information having a pattern of "server2:port"—e.g., a server and port number of a protocol server 510 that is mapped to the @bob handle.

In a third stage, the resolver 506 sends a "from:@bob" query to the protocol server 510. In a fourth stage, the protocol server 510 responds to the "from:@bob" query with an authentication challenge. In a fifth stage, the resolver 506 (or another program, or Bob using another program) generates a signed challenge response. The signed challenge response is sent by the resolver 506 to the protocol server 510. In a sixth stage, the protocol server 510 tests the signed challenge response, to determine whether the signed challenge response is valid with respect to the challenge sent to the resolver 506 in the fourth stage.

In a seventh stage, in response to determining that the signed challenge response is valid, the protocol server 510 sends an indication (e.g., "@bob@") to the resolver 506 to indicate that the resolver 506 has been authenticated to the protocol server 510 (e.g., as @bob). The "@bob@" indicator can correspond to a changing of a connection prompt for a connection between the resolver 506 and the protocol server 510. A connection prompt of "@" can indicate an unauthenticated connection and a connection prompt of "@bob@" can indicate a connection authenticated as the user @bob.

In an eighth stage, the resolver 506 sends a "lookup:location@alice" query to the protocol server 510, using the authenticated connection. The protocol server 510 can perform a look up of the "location@alice" address on behalf of the resolver 506 (e.g., on behalf of @bob). The protocol server 510 may first need to obtain server information for a protocol server 512 that is mapped to the @alice handle.

In a ninth stage, the protocol server 510 sends a query of "alice" to the root server 508 (or to another root server). In a tenth stage, the root server 508 (or another root server to which the "alice" query was sent) sends server information for the protocol server 512 (e.g., of a pattern of "server1:port") to the protocol server 510, in response to the "alice" query.

In an eleventh stage, the protocol server 510 sends a "from:@bob" message to the protocol server 512. In a twelfth stage, the protocol server 512 responds to the "from:@bob" request by sending a challenge to the protocol server 510. The challenge is of a form of "xxx@bob:yyy", which represents a challenge/request for the protocol server 510 to set an "xxx@bob" address to a value of "yyy".

In a thirteenth stage, in response to the challenge from the protocol server 512, the protocol server 510 updates, on the protocol server 510, an "xxx@bob" address to the value of "yyy". In a fourteenth stage, the protocol server 510 sends a proof-of-life (e.g., "pol") message to the protocol server 512, to indicate to the protocol server 512 that the requested challenge has been performed. The protocol server 510 is claiming that the protocol server 510 has successfully performed the requested challenge, as the @bob user.

In a fifteenth stage, the protocol server 512 begins a process of validating whether the protocol server 510 successfully performed the requested challenge. The protocol server 512 can perform a public lookup on the protocol server 510 to determine whether the requested address was updated with the requested value. The protocol server 512 may first need to obtain server information for the protocol server 510 before performing the lookup. For example, in the fifteenth stage, the protocol server 512 sends a request to look up server information for the @bob user to the root server 508. In a sixteenth stage, the root server 508 returns server information for the protocol server 510 (e.g., of a pattern of "server2:port") to the protocol server 512.

In a seventeenth stage, the protocol server 512 establishes a separate connection with the protocol server 510 (e.g., different from the connection used in the eleventh, twelfth, thirteenth, and fourteenth stages). The protocol server 512 sends a "lookup:xxx@bob" request, over the separate connection, to the protocol server 510. In an eighteenth stage, the protocol server 510, in response to the "lookup:xxx@bob" request, retrieves a "yyy" stored at the "xxx@bob" address and sends a "data:yyy" response to the protocol server 512.

In a nineteenth stage, the protocol server 512 performs a test to determine whether the "data:yyy" value received from the protocol server 510 matches a requested "yyy" value that was included in the challenge sent to the protocol server 510 in the twelfth stage. If the test fails, the protocol server 512 can drop connection(s) to the protocol server 510. If the test succeeds, the protocol server 512 can, in a twentieth stage, return an indication (e.g., "@bob@") to the protocol server 510 over the first connection to indicate to the protocol server 510 that the protocol server 510 has been authenticated as the @bob user on the protocol server 512.

In a twenty-first stage, the protocol server 510 sends a "lookup:location@alice" request to the protocol server 512 as a request that has been authenticated as corresponding to the @bob user. In a twenty-second stage, the protocol server 512 retrieves a location@alice value (e.g., "SF Bay Area") that has been specifically shared with the @bob user. The protocol server 512 sends a "data: SF Bay Area" response to the protocol server 510. In a twenty-third stage, the protocol server 510 forwards the "data: SF Bay Area" response to the resolver 506, for example, for presentation to the user Bob 502 and/or for use by an application on the device 504.

Figure 6A:
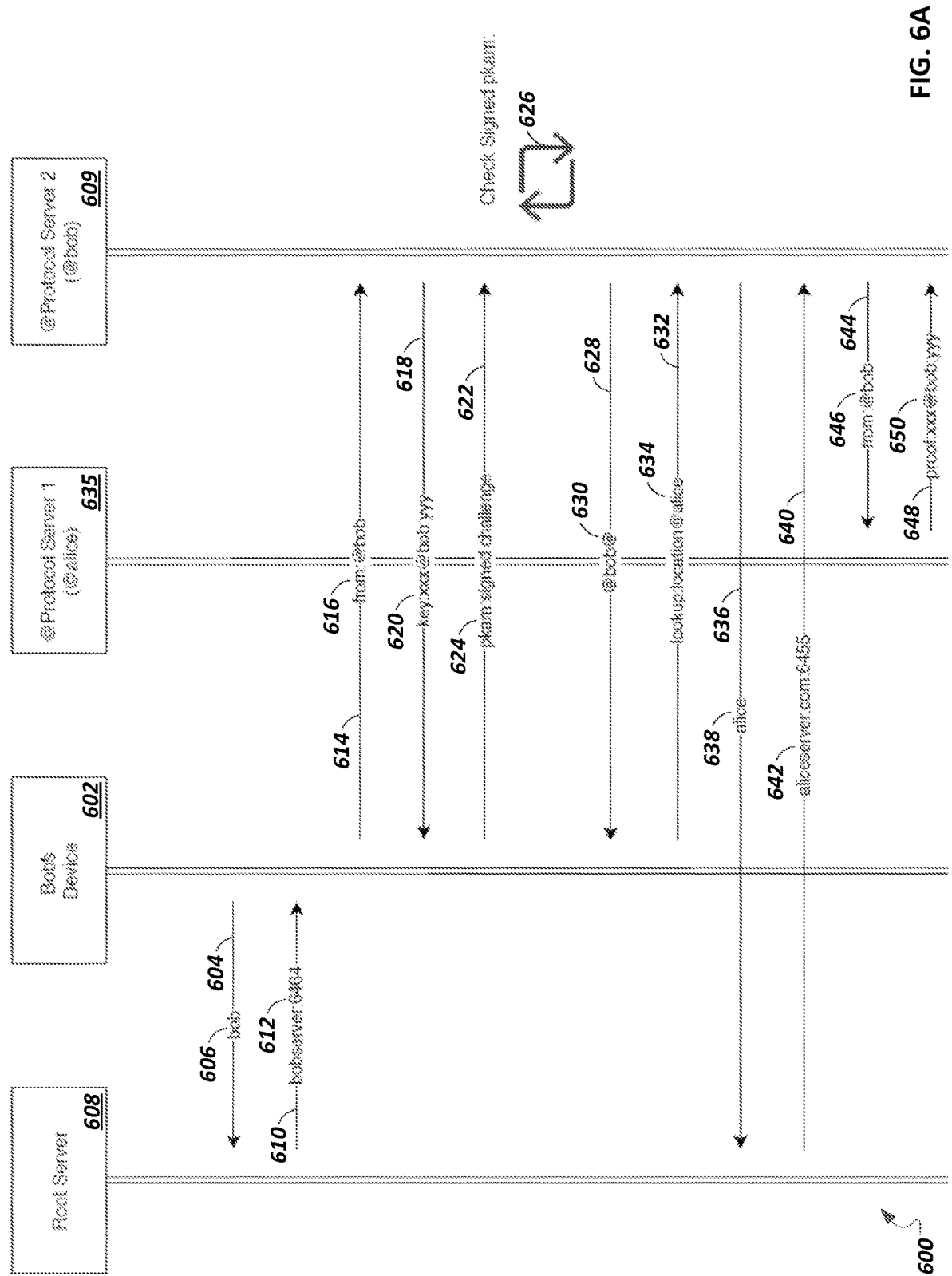
FIGS. 6A-6B are a combined swim lane diagram illustrating an example method for a private lookup transaction.
Figure 6B:
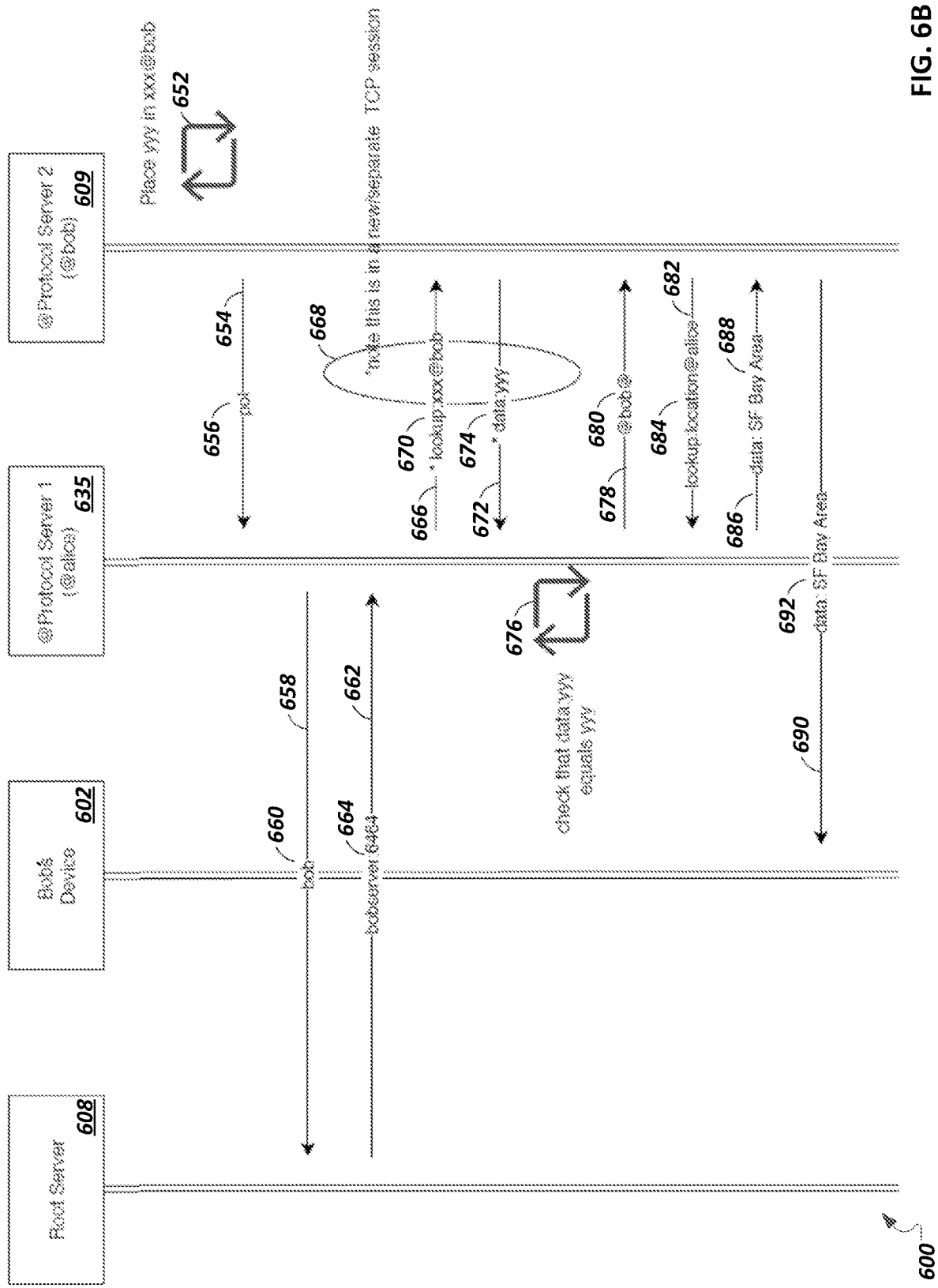

FIGS. 6A and 6B are a combined swim lane diagram illustrating an example method 600 for a private lookup transaction. The method 600 is similar to the method 400, but method 600 uses a different approach of a user's protocol server contacting another protocol server, on behalf of the user (or the user's application). In the example of FIGS.

6A-6B, a user Bob with a handle of @bob can use a device 602 to initiate an authenticated lookup of a location@alice address.

At 604, the device 602 sends a query of "bob" 606 to a root server 608, to obtain server information for a protocol server 609 for the @bob handle.

At 610, the root server 608 returns server and port information 612 of "bobserver:6464" to the device 602, in response to the query 606.

At 614, the device 602 sends a "from:@bob" query 616 to the protocol server 609.

At 618, the protocol server 609 responds to the "from:@bob" query 616 with an authentication challenge 620. The authentication challenge 620 is of a form of "key:xxx@bob:yyy".

At 622, the device 602 generates a signed challenge response 624 (e.g., using a PKAM command) and sends the signed challenge response 624 to the protocol server 609.

At 626, the protocol server 609 tests the signed challenge response, to determine whether the signed challenge response 624 is valid with respect to the challenge 618.

At 628, in response to determining that the signed challenge response 624 is valid, the protocol server 609 sends an indication 630 (e.g., "@bob@") to the device 602 to indicate that the device 602 has been authenticated to the protocol server 609 (e.g., as @bob).

At 632, the device 602 sends a "lookup:location@alice" query 634 to the protocol server 609, using the authenticated connection. The protocol server 609 can perform a look up of the "location@alice" address on behalf of the device 602 (e.g., on behalf of @bob). The protocol server 609 may first need to obtain server information for a protocol server 635 that is mapped to the @alice handle.

At 636, the protocol server 609 sends a query 638 of "alice" to the root server 608.

At 640, the root server 608 sends server information 642 (e.g., of "aliceserver.com:6455") for the protocol server 635 to the protocol server 609, in response to the "alice" query 638.

At 644, the protocol server 609 sends a "from:@bob" message 646 to the protocol server 635.

At 648, the protocol server 635 responds to the "from:@bob" message 646 by sending a challenge 650 to the protocol server 609. The challenge 650 has a pattern of "xxx@bob:yyy", which represents a challenge/request for the protocol server 609 to set an "xxx@bob" address to a value of "yyy".

Referring now to FIG. 6B, at 652, in response to the challenge 650 from the protocol server 635, the protocol server 609 updates, on the protocol server 609, an "xxx@bob" address to the value of "yyy".

At 654, the protocol server 609 sends a proof-of-life (e.g., "pol") message 656 to the protocol server 635, to indicate to the protocol server 635 that the requested challenge has been performed. The protocol server 609 is claiming that the protocol server 609 has successfully performed the requested challenge, as the @bob user.

The protocol server 635 can begin a process of validating whether the protocol server 609 performed the requested challenge. The protocol server 635 can perform a public lookup on the protocol server 609 to determine whether the requested address was updated with the requested value. The protocol server 635 may first need to obtain server information for the protocol server 609. For example, at 658, the protocol server 635 sends a request 660 to look up server information for the @bob user to the root server 608.

At 662, the root server 608 returns server and port information 664 (e.g., "bobserver:6464") for the protocol server 609 to the protocol server 635.

At 666, in a new session 668, the protocol server 635 sends a "lookup:xxx@bob" request 670 to the protocol server 609.

At 672, the protocol server 609, in response to the "lookup:xxx@bob" request 670, retrieves a "yyy" value stored at the "xxx@bob" address and sends a "data:yyy" response 674 to the protocol server 635.

At 676, the protocol server 635 performs a test to determine whether the "data:yyy" value received from the protocol server 609 matches a requested "yyy" value that was included in the challenge 650.

At 678, in response to the test succeeding, the protocol server 635 can return an indication 680 (e.g., "@bob@") to the protocol server 609 to indicate to the protocol server 609 that the protocol server 609 has been authenticated as the @bob user on the protocol server 635.

At 682, the protocol server 609 sends a "lookup:location@alice" request 684 to the protocol server 635 as a request that has been authenticated as corresponding to the @bob user.

At 686, the protocol server 635 retrieves a location@alice value (e.g., "SF Bay Area") that has been specifically shared with the @bob user and sends a "data: SF Bay Area" response 688 to the protocol server 609.

At 690, the protocol server 609 send a "data: SF Bay Area" value 692 to the device 602, for example, for presentation to the user Bob and/or for use by an application on the device 602.

Data Sharing and Encryption

A major issue historically for the adoption of secure communication systems (e.g. PGP (Pretty Good Privacy)) has been the challenge of distributing signing keys used to encrypt/decrypt information exchanged between entities. The @protocol solves this problem in a unique manner by making it easy to securely share information by permission to some other entity. For example, "publickey@alice" can be a common syntax and approach for sharing a public key, and "atsign://publickey@alice" can be a fully qualified endpoint URL that can be distributed. While a public key used for PKI (Public Key Infrastructure) encryption can be shared publicly, typically a user may securely share a public key only to specified users. The @protocol supports both public and private sharing of encryption keys. The @protocol provides a simple means of creating and distributing PKI keys. Distribution and sharing of public keys can come as a side effect of the fact that the protocol itself relies on key sharing capability to securely share data with others. The result is an Internet-scale directory for billions of @sign owners to easily publish and lookup PKI keys on the Internet. Thus the @protocol provides a means for distributing and managing PKI keys at a massive scale.

The @protocol can also provide a system for distributing and managing PKI keys that can provide different responses based on who is requesting a public key. For instance, in addition to distributing encryption keys as outlined above, the protocol can determine which respective encryption key to provide among multiple encryption keys in response to a request, wherein the respective encryption key to provide depends on an identity of a requestor. That is, the protocol can support polymorphic sharing and distribution of encryption keys. This capability can provide additional assurance that only an intended recipient is able to access shared information.

The @protocol's polymorphism capability can enable providing different responses to a query based on which @sign is requesting the data. Polymorphism can be applicable for public, as well as private, sharing. Polymorphism capabilities can have important implications for managing PKI keys and other types of data. For example, a protocol query such as publickey@alice can be responded to with a public key value that is shared without using the proof of life handshake, as a public value shared with all users or a response can include different values for a same publickey@alice query based on a "from" parameter as part of the pol handshake. A given user can share a different public key with each of multiple different other users, for example. For instance, @alice can share a first public key with @bob and a second public key with @sara, each in response to a lookup by @bob or @sara of a publickey@alice key, respectively, based on a determination by @alice for which public key to share with which user. Polymorphic responses to queries for keys can provide a simple, scalable system for managing public and private PKI keys.

Additionally, the @protocol can provide a system for distributing content to multiple recipients that is encrypted one time such that only the intended recipients can access the content by using those intended recipients' respective personal keys. In further detail, the @server sharing protocol can support encryption of information that is encrypted once with a shared symmetric key, and is then shared with any number of others in such a manner that only the recipient can decrypt the information using their private key with asymmetric decryption. Such sending can be subject to other privacy controls inherent in the @protocol. For example, decrypted information can be set to remain accessible for some defined time period after which it will be automatically deleted.

With the @protocol, a hybrid symmetric/asymmetric encryption scheme can be used wherein the information can be first encrypted using a shared symmetric key set by the sender. The shared symmetric key can then itself be encrypted using asymmetric encryption with the sender's private key and the recipient's public key from the recipient's @server. A result of the hybrid symmetric/asymmetric scheme can be that information that is shared by the sender can only be retrieved using the recipient's private key which can provide access to the shared symmetric key set by the sender. The recipient can then use the shared symmetric key to decrypt the information shared with the recipient.

Figure 7:
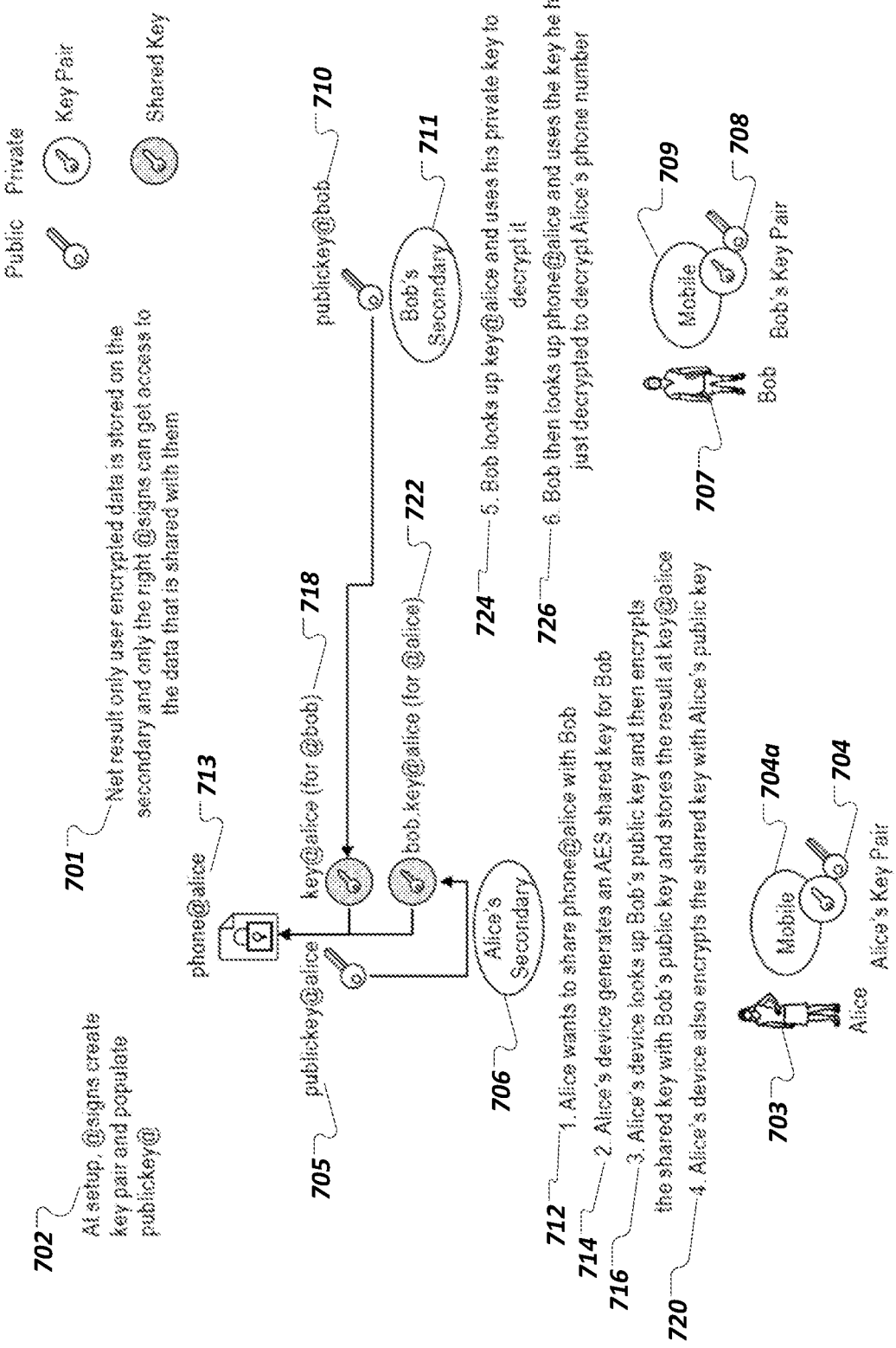
FIG. 7 illustrates an example system for use of encryption keys.

FIG. 7 illustrates an example system 700 for use of encryption keys. As indicated by a note 701, a net result of a security approach can be that only user-encrypted data is stored on secondary servers and only authorized @sign users can access data based on sharing privileges granted by data owners.

As described in a note 702, during setup for an @sign, a public/private key pair is created and a public key service is populated. For example, for an @alice user 703, a key pair 704 can be created on Alice's device 704 and a publickey@alice value 705 can be stored on Alice's secondary server 706. As another example, for an @bob user 707, a key pair 708 can be created on Bob's device 709 and a publickey@bob value 710 can be stored on Bob's secondary server 711.

In a first stage 712 of a use case scenario, Alice wants to share a phone@alice value 713 with the @bob user 707.

In a second stage 714, Alice's device 704 generates a shared key (e.g., an Advanced Encryption Standard shared key) for the @bob user 707.

In a third stage 716, Alice's device 704 requests that Alice's secondary server 706 perform a lookup for the public key 710 for the @bob user 707 that is stored on Bob's secondary server 711. Alice's device 704 encrypts the shared key with Bob's public key and requests storage of an encrypted shared key 718 on Alice's secondary server 706.

In a fourth stage 720, Alice's device 704 encrypts the shared key with Alice's public key 705, and stores an encrypted shared key 722 on Alice's secondary server 706.

In a fifth stage 724 corresponding to Bob desiring to access Alice's phone number, Bob's device 709 sends a lookup request to Bob's secondary server 711 for Bob's secondary server 711 to look up the shared encrypted key 718. Bob's device 709 uses a private key of the key pair 708 to decrypt the encrypted shared key.

In a sixth stage 726, Bob's device 709 sends a lookup request to Bob's secondary server 711 for Bob's secondary server 711 to look up the phone@alice value 713 from Alice's secondary server 706. Bob's device 709 receives the phone@alice value 713 as an encrypted phone number. Bob's device 709 uses the shared key obtained from decrypting the encrypted shared key to decrypt the encrypted phone number, to obtain an unencrypted phone number value (e.g., Alice's phone number she has shared with Bob).

Figure 8:
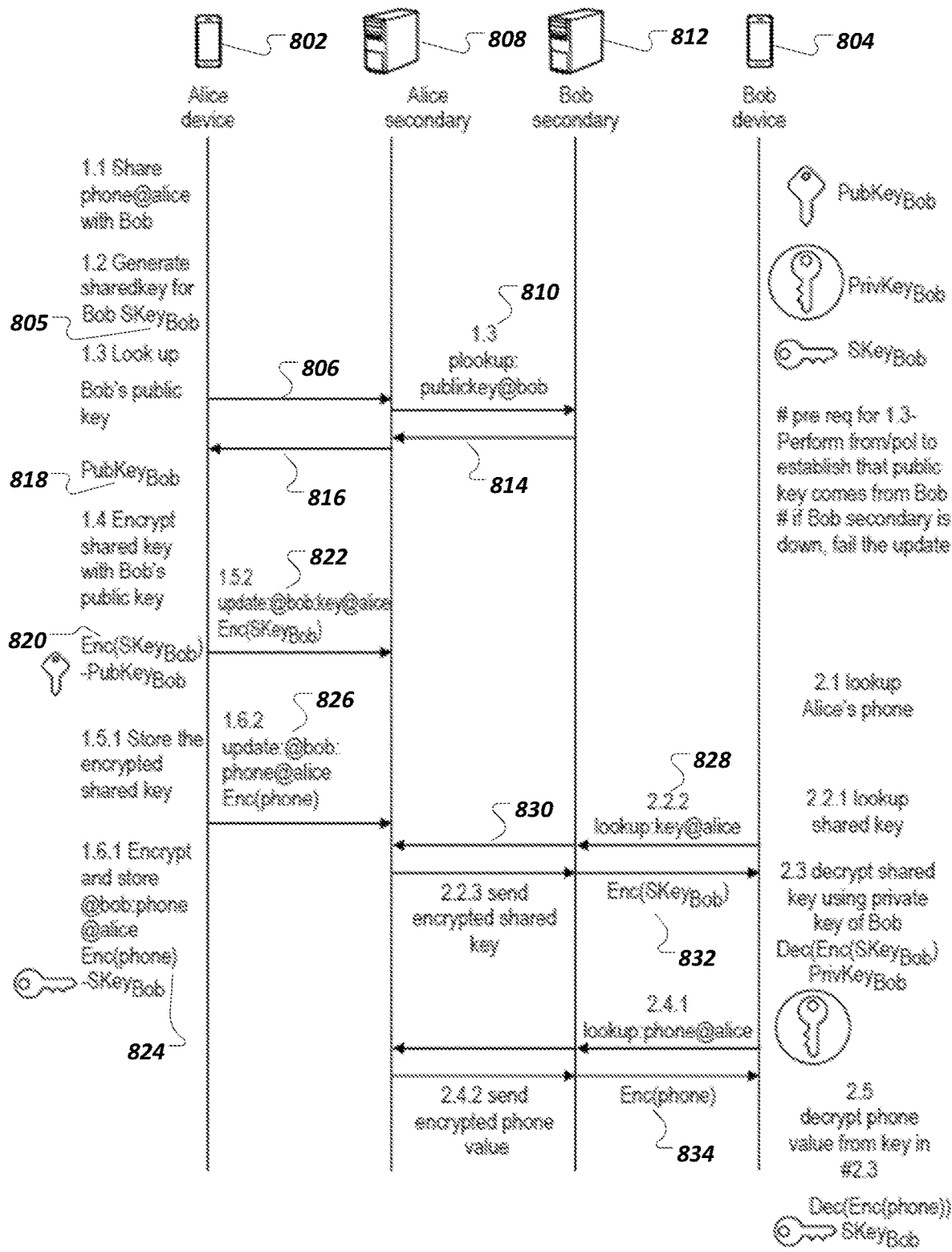
FIG. 8 illustrates an example system for use of encryption keys.

FIG. 8 illustrates an example system 800 for use of encryption keys. In step 1.1, a user Alice (e.g., corresponding to Alice's device 802) decides to share a phone@alice value with a user Bob (corresponding to Bob's device 804).

For instance, in step 1.2, Alice's device 802 generates a shared key 805 for the user Bob.

In step 1.3, Alice's device initiates a lookup of Bob's public key. Alice's device 802 sends a lookup request 806 to Alice's secondary server 808. Alice's secondary server 808 sends, on behalf of Alice's device 802, a lookup request 810 to Bob's secondary server 812. Bob's secondary server 812 sends a lookup response 814 to Alice's secondary server 808. Alice's secondary server 808 forwards the lookup response 814 as a forwarded response 816 to Alice's device 802. Alice's device 802 receives a copy of Bob's public key 818 in the forwarded response 816.

In step 1.4, Alice's device 802 encrypts the shared key 805 with the copy of Bob's public key 818 to generate an encrypted shared key 820.

In step 1.5.1, Alice's device 802 initiates storing of the encrypted shared key 820 on Alice's device 802.

For instance, in step 1.5.2, Alice's device 802 sends an update request 822 to Alice's secondary server 808 to update @bob:key@alice with the encrypted shared key 820.

In step 1.6.1, Alice's device 802 encrypts a phone@alice value Alice has shared with Bob (e.g., as @bob: phone@alice), using the shared key 805, to generate an encrypted phone value 824.

In step 1.6.2, Alice's device 802 sends an update request 826 to Alice's secondary server 808 to update an @bob: phone@alice key with the encrypted phone value 824.

At a later time, in step 2.1, Bob wants to look up Alice's phone number.

In step 2.2.1, Bob's device 804 initiates a lookup of the shared key shared between Bob and Alice.

For example, in step 2.2.2, Bob's device 804 sends a lookup request 828 to Bob's secondary server 812 to lookup the shared key shared between Bob and Alice. Bob's secondary server 812 forwards the lookup request 828 to Alice's secondary server 808, as a forwarded request 830.

In step 2.2.3, Alice's secondary server 808 sends an encrypted shared key to Bob's secondary server 812. Bob's secondary server forwards an encrypted shared key 832 to Bob's device 804.

In step 2.3, Bob's device 804 decrypts the received encrypted shared key 832 using a private key stored on Bob's device 804, to obtain an unencrypted shared key.

In step 2.4.1, Bob's device 804 sends a lookup request to Bob's secondary server 812 to look up Alice's phone number that Alice has shared with Bob. Bob's secondary server 812 can forward the lookup request to Alice's secondary server 808.

In step 2.4.2, Alice's secondary server 808 sends an encrypted phone value to Bob's secondary server 812. Bob's secondary server 812 forwards an encrypted phone value 834 to Bob's device 804.

In step 2.5, Bob's device decrypts the encrypted phone value 834, using the shared key, to obtain the phone value for Alice.

Figure 9:
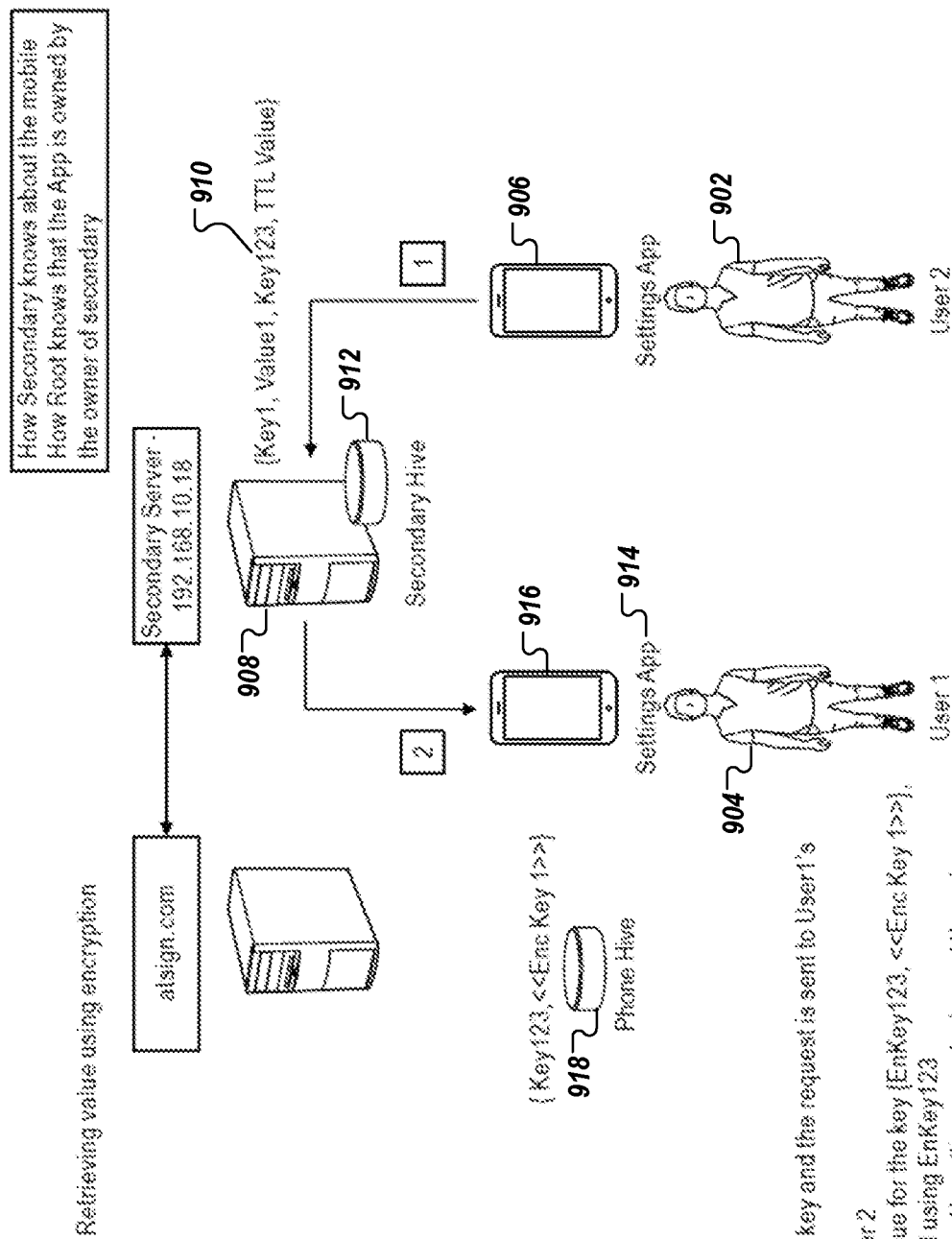
FIG. 9 illustrates an example system for key value retrieval.

FIG. 9 illustrates an example system 900 for key value retrieval.

At a first stage, a user 902 (e.g., user2) desires to obtain a key of a user 904 (e.g., user1). A request for the key can be sent from a device 906 of the user 902 to a secondary server 908 associated with the user 904.

In a second stage, the user 902 proves that s/he is user2 (e.g., using a pol approach as described herein).

In a third stage, the secondary server 908 locates an entry 910 in a secondary storage 912 that had been encrypted using an encryption key created by a settings application 914 on a device 916 of the user 904. The entry 910 can include a key code (e.g., Key123), for example.

In a fourth stage, the secondary server 908 can send the entry 910 (or a portion of the entry 910) with a request to the device 916 for the settings application 914 to decrypt the entry 910.

In a fifth stage, the settings application 914 can locate, e.g., in local storage 918, a key for the key code included in the entry 910 and use the key to decrypt the entry 910 (or to decrypt a value associated with the entry 910). The decrypted value is sent by the device 916 to the secondary server 908. The secondary server can forward the value to the device 906 so that the user 902 can view the decrypted value (or otherwise use the decrypted value, e.g. in an application on the device 906).

An ability of the @protocol to locate edge resource endpoints that securely store a user's data gives rise to a new class of applications that can communicate with each other directly (e.g., P2P). This is an important capability in that it removes a scenario for some intermediary (e.g., typically called a server, but could also be a more nefarious man in the middle scenario) being used to store data and manage interactions with other users that want to access stored data. Additionally, end-to-end encryption ensures that all data and traffic only flows between the involved parties and is not susceptible to surveillance. Accordingly, the @protocol can support a new generation of true P2P applications that can securely share information between permitted users without fear of surveillance by intermediaries, infrastructure providers, or others. Additionally, registering for a new protocol-enabled application can be a simple process for users, because a user can register using their @sign which can reduce sign-up/registration steps and can enable user-controlled access of data to application providers/developers, rather than a user having to separately and repeatedly provide multiple specific items of user information each time a user installs or registers for an application.

Figure 10:
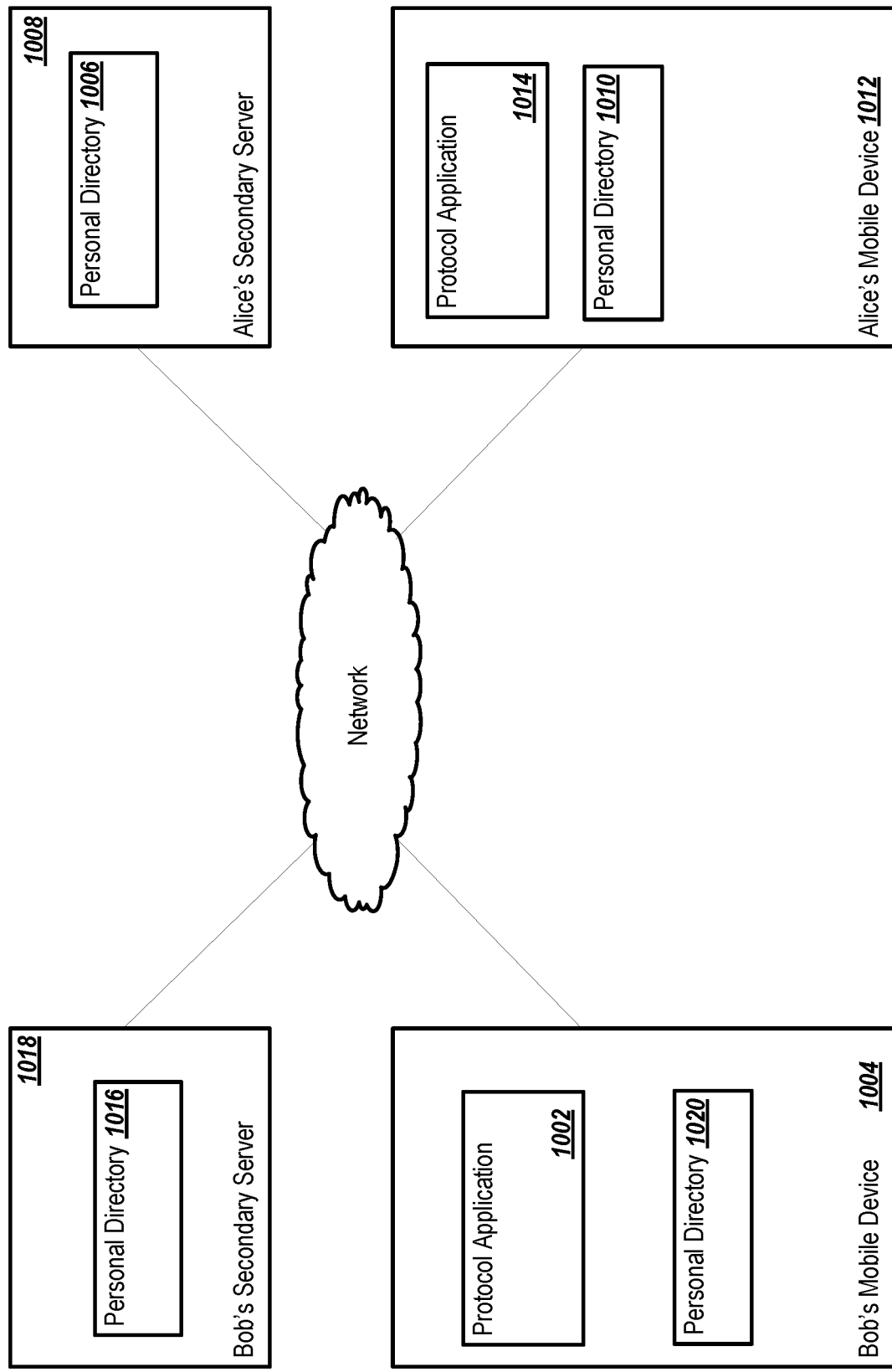
FIG. 10 illustrates an example system for P2P applications.

FIG. 10 illustrates an example system 1000 for P2P applications. An application 1002 running on a device 1004 of a user @bob can request data for an @alice user stored, e.g., in a personal directory 1006 of a secondary server 1008 and/or a personal directory 1010 on a device 1012 of @alice. Similarly, an application 1014 running on the device 1012 of @alice can request data for the @bob user stored, e.g., in a personal directory 1016 of a secondary server 1018 and/or a personal directory 1020 on the device 1004 of @bob. Specific application examples are described in more detail below.

Data sharing between the device 1004 and the device 1012 (e.g., and/or between the application 1014 and the application 1002) can be conducted without a need of or actual surveillance by a central server. P2P application functionality can be configured with no central server or entity being able to track a user's use of or sharing of data. Data that a user or user application determines to share with another user or application is encrypted, as described above. Also as described above, one client application of one @protocol user can be notified about a change in data for another @protocol user.

Website Login Functionality Using the Protocol

Figure 11:
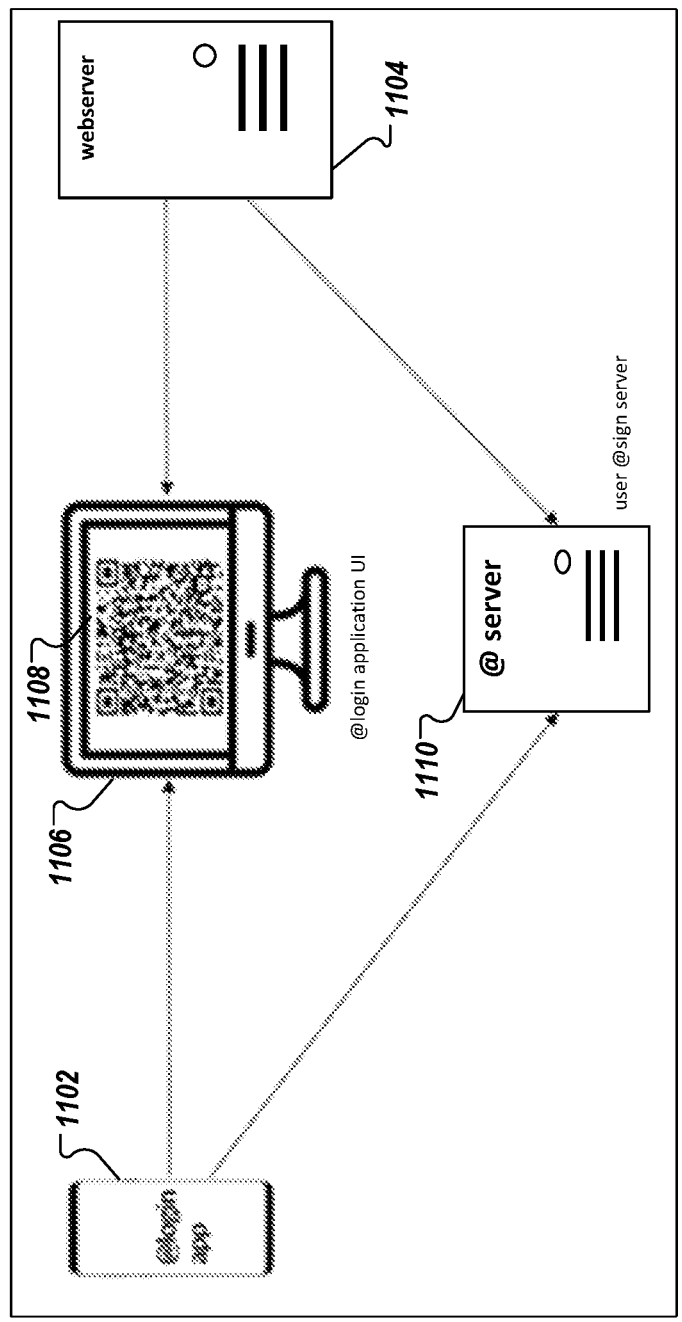
FIG. 11 illustrates an example system for website login functionality using a protocol for sharing and managing personal information.

FIG. 11 illustrates an example system 1100 for website login functionality using a protocol for sharing and managing personal information. An @login application that can run, for example, on a mobile device 1102, is a mobile application that can provide authentication for people/entities/things to Internet-connected services through the use of unique @sign/cryptographic key pairs (public/private) and the use of the @protocol. The @login application can be used, for example, to authenticate to a website provided by a web server 1104 to allow a person to login and automatically provide extra information to that website once authenticated.

For example, from a user's perspective, a user can visit a website (e.g., a trusted website) and be given an option (e.g., in a user interface shown on a display 1106) to login using an @sign. The display 1106 can be a display of the mobile device 1102 or can be a display of a different device (e.g., a desktop device) being used by the user. The user can enter their @sign in the user interface and can be presented, for example, a challenge code, such as a graphical code (e.g., a QR (Quick Response) code) 1108 and/or a numeric code (e.g., a PIN (Personal Identification Number) code. The user can enter the numerical code or scan the graphical code using the @login application in order to be logged into the website, without entering any further information. In some cases, the web server 1104 of the trusted website can obtain certain information that the user has shared with the website. If the user changes their mind and no longer trusts the website the user can remove access to the user's data and have confidence that the user's data can no longer be obtained by the web server 1104 of the website.

In further detail, the web server 1104, in response to receiving an @sign corresponding to a login request, can provide a one-time challenge code that can be valid for a short period of time (e.g., a certain number of seconds). In response to the user typing in or scanning a challenge code, the @login application can cryptographically sign the challenge with a private key and post a signature on a secondary server 1110 of the @sign. The web server 1104 of the website can attempt a lookup of the signature on the secondary server 1110 of the @sign and check to see if the signature is correct by using the public key of the @sign (e.g., which can be publicly available for every @sign). If the challenge has been signed correctly, then the web server

1104 can allow the login. If the user has allowed for data sharing with the website (e.g., with an @sign of the website), the web server 1104 of the website can request (e.g., from the secondary server 1110) user information for the user's @sign, which may include the user's name, date of birth, address, phone, etc., without further user interaction (e.g., the user can avoid filling of forms). If the user logging in trusts the website's @sign, then the user can share data with the website, which can provide a fast, secure, and user-friendly login experience.

In some cases, the user can view the website on a first computer (e.g., a desktop computer) and scan or enter the challenge code on the mobile device 1102. The mobile device 1102 can be used to run the @login application and cryptographically sign the challenge since the mobile device 1102 can store cryptographic keys in a hardware-entrusted root, for example. As another example, the user can view the website using a mobile browser running on the mobile device 1102 and one or more mechanisms, such as deep links or manual entry of a PIN, can be used to provide the challenge to the @login application running on the mobile device 1102.

The @login application can leverage the @protocol's ability to share data security and privately with known counter parties. As shown in the figures below, the @login application can be used for scenarios in which a web server of a website either is or is not already associated with a unique @sign identifier within the platform. In both scenarios, techniques can be used for allowing secure logins using the underlying identity management platform and encryption challenges of the @protocol.

Figure 12:
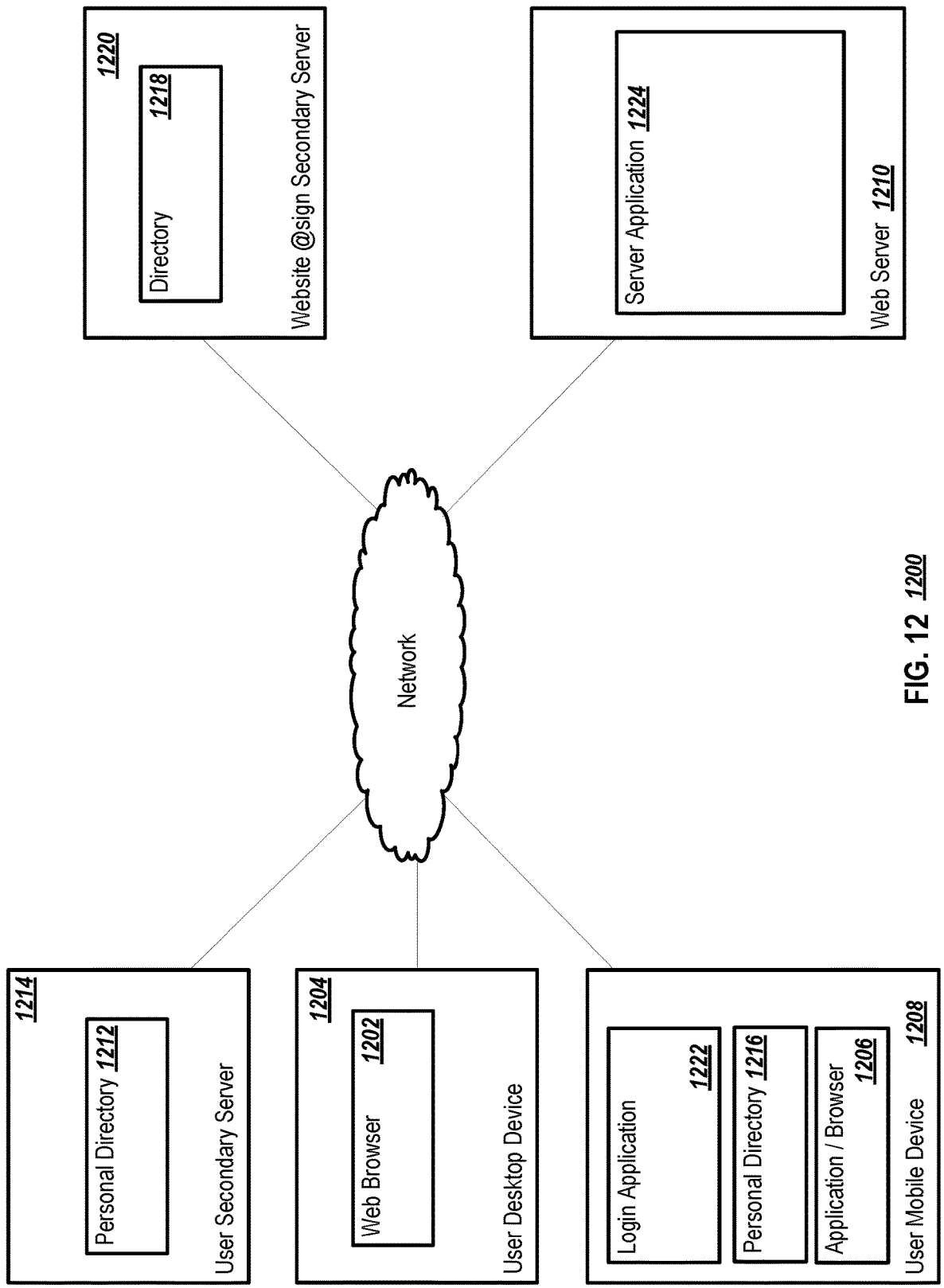
FIG. 12 is a block diagram of an example system for supporting website login functionality.

FIG. 12 is a block diagram of an example system 1200 for supporting website login functionality. A user can use, for example, a web browser 1202 on a desktop device 1204 or a mobile application or browser 1206 on a mobile device 1208 to view web pages provided by a web server 1210. The user can have an @sign, and personal information for the user can be stored in a personal directory 1212 of a secondary server 1214. As described above, the mobile device 1208 of the user can include a local personal directory 1216 which can be a cache of some or all information in the personal directory 1212. In some cases, an entity that manages the web server (e.g., an entity associated with the website itself) can have an @sign and information for the entity that the entity wishes to share with other protocol users can be stored in a directory 1218 that is managed by a secondary server 1220 associated with the entity Some web page(s) provided by the web server 1210 can require that a user log in to the web server 1210. The web server 1210 can provide, for example, a login web page or user interface to the desktop device 1204 or the mobile device 1208 that enables the user to enter an @sign and send the @sign to the web server 1204. The web server 1210 can generate a challenge code and provide the challenge code to the desktop device 1204 or the mobile device 1208. A login application 1222 running on the mobile device 1204 can obtain the challenge code (e.g., the user can scan the code, enter the code, or select a deep link that enables the login application 1222 to obtain the code). The login application 1222 can sign the challenge code using a private key associated with the @sign and place the signed challenge at a particular location in the personal directory 1212. The private key can be stored on the mobile device 1208, for example.

A server application 1224 running on the web server 1210 can look for and retrieve the signed challenge from the particular location in the personal directory 1212. The server application 1224 can also obtain a public key of the user from the personal directory 1212 and use the public key to determine whether the signed challenge was signed correctly by the login application 1222. If the login application 1222 correctly signed the challenge code, the server application 1224 can effectively log the user into the web site served by the web server 1210. Other details and alternatives of a login handshake performed using the protocol are described below.

Figure 13:
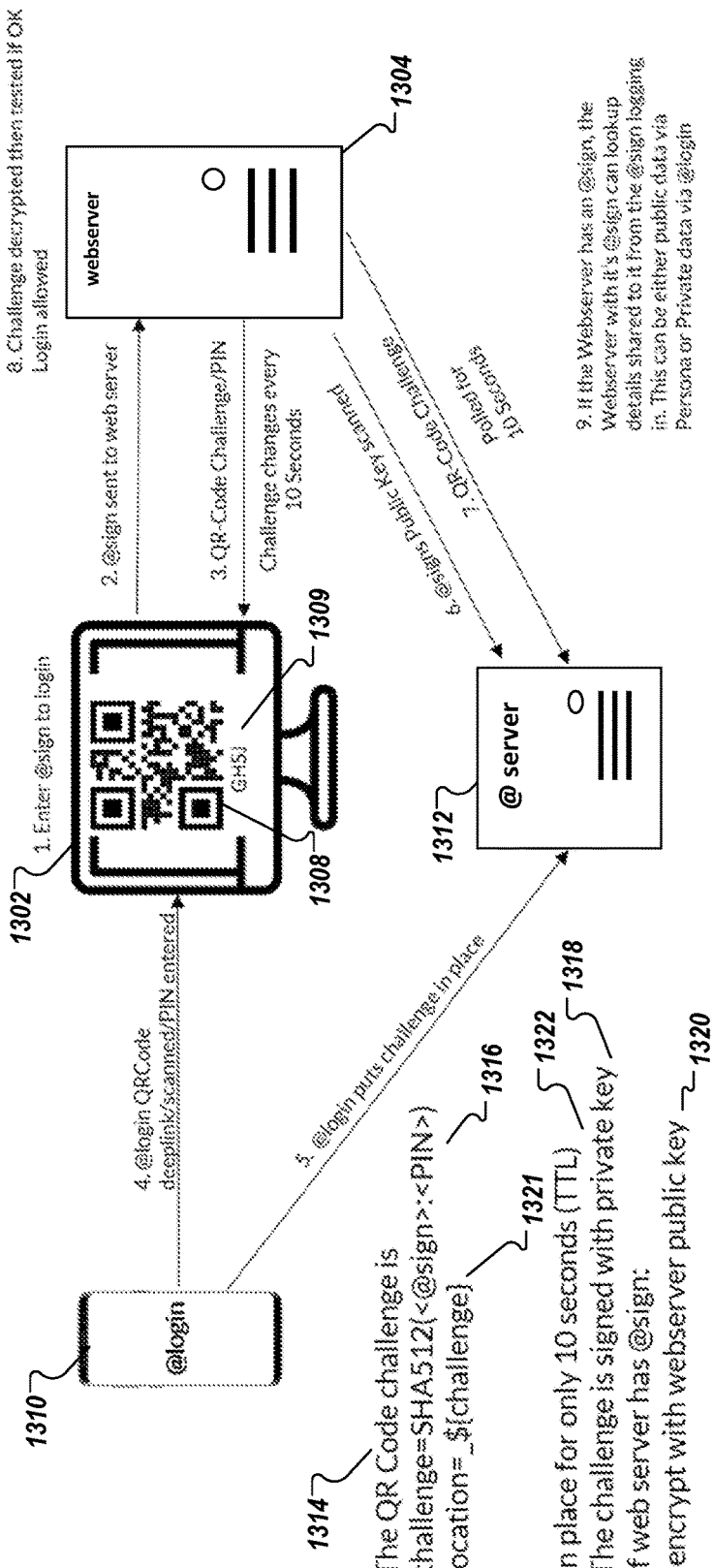
FIG. 13 is a block diagram of an example architecture for supporting website login functionality.

FIG. 13 is a block diagram of an example architecture 1300 for supporting website login functionality. In a first phase (e.g., labeled "1."), a prompt is displayed in a @login user interface on a device 1302 of the user. The prompt can instruct the user to enter their @sign to log in to a website hosted by a web server 1304, for example. The @login user interface can enable the user to enter their @sign handle. In some implementations, the @login user interface can prompt the user to enter a PIN of the user's choosing.

In a second phase, the @sign handle entered by the user is sent from the device 1302 to the web server 1304. If the @login user interface asked the user to enter a PIN of the user's choosing, the PIN of the user's choosing can also be sent from the device 1302 to the web server. The PIN of the user's choosing can also be stored on the device 1302 of the user. In a third phase, the web server 1304 generates a code challenge and sends the code to the device 1302. The code challenge can be a PIN (which may be embodied in a QR code), for example. The device 1302 can display the challenge code, in the @login user interface, as a presented code 1308 and/or a presented PIN 1309, after receiving the code from the web server 1304. In implementations in which the user has provided a PIN of the user's choosing, the web server 1304 can generate the challenge code based on the PIN of the user's choosing. Basing the challenge code on the PIN of the user's choosing can reduce a chance of a replay attack, for example.

In a fourth phase, the user can use, for example, an @login application running on a mobile device 1310 to scan the presented code 1308. As another example, the user can use the @login application to enter the PIN 1309. The mobile device 1310 may be a different device than the device 1302. For example, the device 1302 can be a desktop device and the user can use the mobile device 1310 to scan the presented code 1308. In some cases, the device 1302 and the mobile device 1310 are the same device. For instance, the user can view the PIN 1309 in a webpage provided by the web server 1304 that is presented in a web browser on the mobile device 1310. The user can switch to the @login application on the mobile device 1310 and enter the PIN into the @login application.

In a fifth phase, the @login application can place a challenge value (that is based on the code challenge) at a specified location on an @sign server 1312 that is associated with the @sign of the user. As indicated by a note 1314, the challenge value can be computed by creating a hash of the user's @sign combined with the code challenge/PIN 1316. In implementations in which the user had provided a PIN of the user's choosing, the PIN of the user's choosing can be incorporated into the challenge value. As indicated by a note 1318, the @login application can sign the challenge value with a private key associated with the @sign. In some implementations, a SHA512 hash algorithm can be used to create the challenge value (although other hash functions can be used). As an example, when the user's @sign is @alice, the PIN is GH5J, and the SHA512 algorithm is used, the challenge value can be: 1e1311d473b211796e3d1 635079aef297051a2fe6f52decf06a1e28e1b3c2572a796eb 51c1a 2b0d7fdb4cdb55cc0ecd040e8c5a3533f888a489d207 ba8f0c942.

As indicated by a note 1320, if the web server 1304 has an associated @sign, the @login application can encrypt the signed challenge value with a public key of the web server. For example, the @login application can query a secondary @sign server associated with the web server 1304 (or associated with the website which the web server 1304 serves) for the public key of the web server 1304. The @login application can place the signed challenge value at a location 1321 on the @sign server 1312. The location 1321 is a specified location in the @ namespace on the @sign server 1312 where the signed challenge value can be found by the web server 1304.

The location 1321 can be based on the challenge value. In some implementations, the location 1321 can be the challenge value with an added "_____" prefix. A "_____" character in the location 1321 can signify that the location can be a key that is hidden (e.g., not returned) by a scan verb. That is, an entity such as the web server 1304 can look up the signed challenge value using the location key but would have to know the value of the location key before performing the look up (i.e., an entity that does not know the location 1321 cannot use the scan verb to discover the location key). As indicated by a note 1322, the challenge value can be placed in the specified location for a certain amount of time. For instance, a TTL setting can be configured, for example to ten seconds, which means that the web server 1304 has ten seconds to retrieve the signed challenge value before the signed challenge value is removed from the @sign server 1312.

As described in a note 1322, in some implementations, the @login application can create a nonce (e.g., a random number) and place the nonce at a particular location in the @sign server 1312. For example, the @login application can place the nonce at a location value that has a pattern of: _nonce.<PIN>.login<@sign>. For instance, when the user's @sign is @alice, the PIN is GH5J, and the nonce is a random value of 1451, the nonce value of 1451 can be placed in the @sign server 1312 at a location of "_nonce.GH5J.login@alice". As described by a note 1324, when a nonce is used, the nonce value can be combined with the PIN and the user's @sign when creating a challenge value.

In a sixth phase, the web server 1304 obtains a public key associated with the @sign of the user (e.g., by querying the @sign server 1312). In implementations where a nonce is used, the web server 1304 can retrieve the nonce from the @sign server (e.g., if the PIN is GH5J and the user's @sign is @alice, the web server 1304 can retrieve the nonce from the @sign server 1312 using a lookup of a key of _nonce.GH5J.login@alice). In a seventh phase, the web server 1304 retrieves, from the @sign server 1312, the signed challenge value placed by the @login application. The web server 1304 can poll the @sign server 1312 for a predetermined period of time (e.g., ten seconds) to attempt to retrieve the signed challenge value, for example.

In an eighth phase, the web server 1304 can perform one or more operations to validate the retrieved signed challenge value. For example, when the web server 1304 has an @sign and @login application had encrypted the signed challenge value using the public key of the @sign of the web server 1304, the web server 1304 can decrypt an encrypted signed challenge value using a private key of the web server to extract a signed challenge value. The web server 1304 can use a public key of the @sign of the user to decrypt the signed challenge value (e.g., to obtain an extracted challenge value). As described above, the challenge value generated by the @login application can be a hash of a combination of the @sign of the user and the challenge code previously provided to the device 1302 of the user (and possibly a nonce value). Accordingly, to test the extracted challenge value, the web server 1304 can perform a hash operation on a combination of the @sign of the user and the challenge code provided to the device (and possibly a nonce value retrieved from the @sign server 1312). For example, the web server can perform a SHA512 hash operation on a @alice:GH5J value (with a possible nonce suffix) that is a combination of the @alice handle and a GH5J PIN that the web server 1304 knows was sent to the device 1302 of the user. If a result of the hash operation equals the extracted challenge value, the web server 1304 can determine that the user has successfully performed the requested login procedure using the @protocol. Accordingly, the web server 1304 can allow the user to log in to the website. For example, the web server 1304 can generate another web page to provide to the device 1302 of the user that is a landing page for logged-in users of the web site. If the extracted challenge value does not equal the result of the hash operation performed by the web server 1304, the web server 1304 can deny the login request. For example, the web server can generate or a login-failed web page and provide the login-failed web page to the device 1302 of the user. The login-failed web page can also be generated and provided to the device 1302 of the user if the web server fails to receive a signed challenge value from the @sign server 1312, for example. For instance, the web server 1304 may poll the @sign server 1312 for a certain number of seconds or until a signed challenge value is successfully received. In implementations in which the user provided a PIN of the user's choosing, the web server 1304 can perform an algorithm that uses the PIN of the user's choosing to extract the challenge value.

If the web server 1304 has an @sign, a ninth phase can be performed in some implementations (or for some web pages or web servers). For example, the user may have using the @protocol to share certain information with the @sign of the website. The web server 1304 can lookup information at the @sign server 1312 that has been explicitly shared by the user with the @sign of the website. The web server 1304 can use information for the user that has been received from the @sign server for use in one or more web pages generated by the web server 1304 for the user. For example, the web server 1304 can provide a form page that includes pre-filled information that the user has shared with the @sign of the website.

Figure 14A:
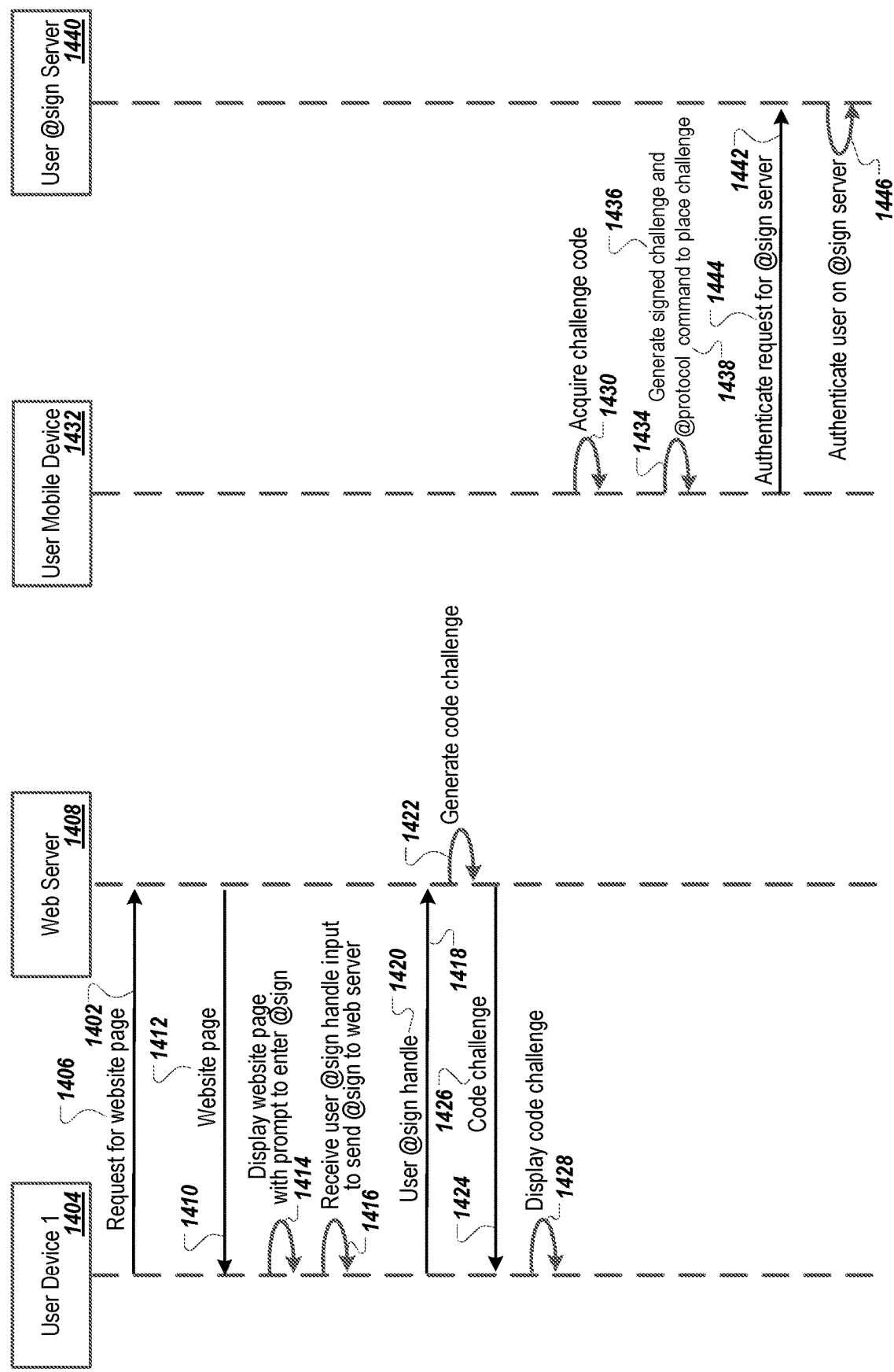
FIGS. 14A-14C illustrate a swim lane diagram for website login scenarios using a protocol for sharing and managing personal information.
Figure 14B:
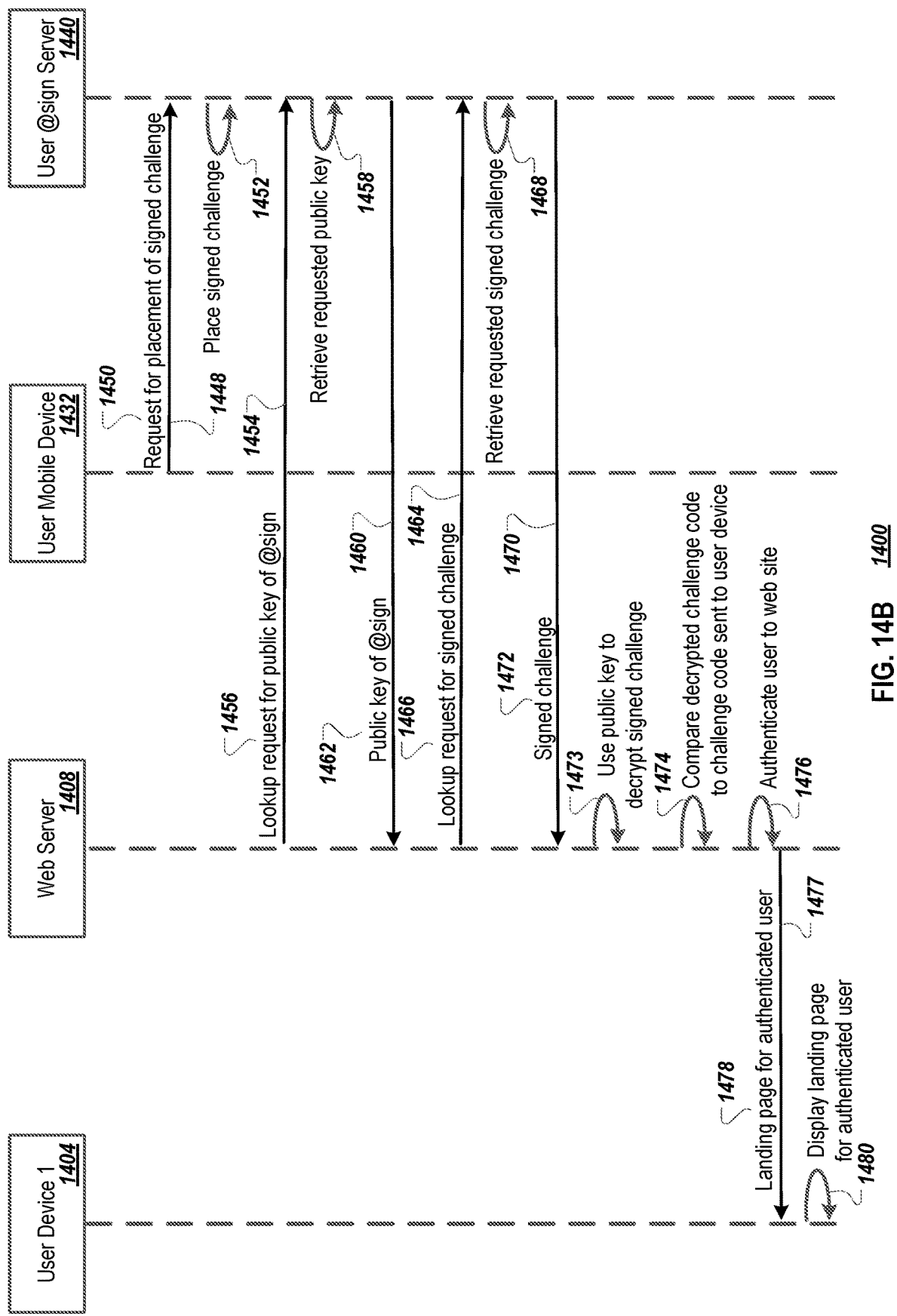
Figure 14C:
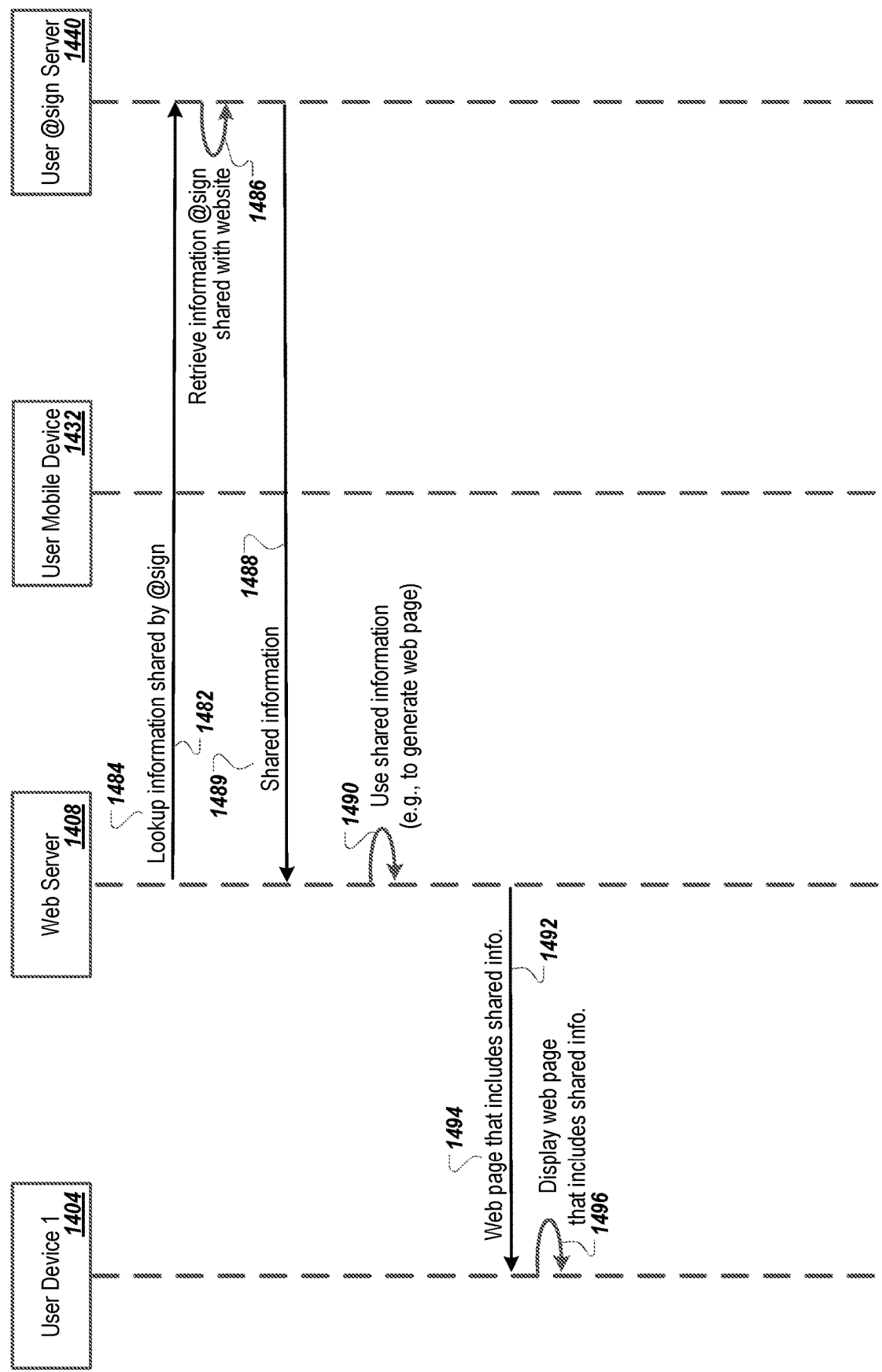

FIGS. 14A-14C illustrate a swim lane diagram 1400 for website login scenarios using a protocol for sharing and managing personal information. At 1402, a user device 1404 of a user sends a request 1406 to a web server 1408 for a web page served by the web server 1408.

At 1410, the web server 1408 sends web page information 1412 for the requested web page to the user device 1404 in response to the request 1406.

At 1414, the user device 1404 uses the received web page information 1412 to display the web page on the user device 1404. The web page can include a prompt (e.g., and an associated input field) for entering an @sign to login to the website. The web page can also include a "login" button or similar user interface control that the user can select or trigger to request sending of the @sign to the web server 1408 to initiate a login process at the web server 1408.

At 1416, the user device 1404 receives an @sign of the user that the user has entered into the web page. The user device 1404 can receive the @sign as part of handling an event related to the user selecting a login button or some other trigger event (e.g., a press of an "enter" key) for requesting initiation of a login process.

At 1418, the user device 1404 sends an @sign handle 1420 of the user to the web server 1408.

At 1422, the web server 1408 generates a code challenge. The code challenge can be a randomly-generated PIN, for example. In some implementations, the code challenge can be represented or incorporated into a QR code image. The web server 1408 can generate a code challenge web page that includes the code challenge.

At 1424, the web server 1408 sends a generated code challenge 1426 (e.g., as part of the code challenge web page) to the user device 1404.

At 1428, the user device 1404 displays the code challenge. For example, the user device 1404 can display the code challenge web page that includes the PIN and/or the QR code image generated by the web server 1408.

At 1430, a mobile device 1432 of the user can acquire the a challenge code using one of a variety of approaches. For instance, in some implementations, the mobile device 1432 is a different device than the user device 1404. For example, the user device 1404 can be a desktop device and the user can use, for example, an @login application on the mobile device 1404 to scan a QR code that is included in the code challenge web page that is displayed on the user device 1404. As another example, the user can use the @login application on the mobile device 1430 to enter a PIN that is included in the code challenge web page that is displayed on the user device 1404.

In some implementations, the user device 1404 and the mobile device 1432 are the same device. The mobile device 1432 can acquire the challenge code as a result of a user transitioning from a web browser that is displaying the code challenge web page to the @login application and using the @login application to enter a PIN that is displayed in the code challenge web page. As another example, the code challenge web page can display a deep link that includes the challenge code and a link to the @login application. In response to user selection of the deep link, the @login application can acquire the challenge code.

At 1434, the mobile device 1432 generates a signed challenge value 1436 and an @protocol command 1438 for placing the signed challenge value at a particular location in a namespace of an @sign server 1440 of the user. As described above with respect to FIG. 14, the mobile device 1432 can generate the signed challenge value 1436 by signing a challenge value that is based on the challenge code using a private key associated with the @sign of the user. Additionally, if the web server 1408 (e.g., or the website that is served by the web server 1408) has an @sign, the mobile device 1432 can encrypt the signed challenge value using a public key associated with the @sign of the web server 1408. For example, the mobile device 1432 can query an @sign server associated with the web server 1408 for the public key associated with the web server 1408 (the @sign server associated with the web server 1408 may reside on the web server 1408 or on a different device than the web server 1408). Also as described above with respect to FIG. 13, the location in the namespace of the @sign server 1440 at which to store the signed challenge value can be a particular location value that is determined based on the challenge value.

At 1442, the mobile device 1432 sends an authentication request 1444 to authenticate the mobile device 1432 on behalf of the user at the @sign server 1440.

At 1446, the @sign server 1440 authenticates the user on the @sign server (e.g., using user protocol authentication processes described above).

Referring now to FIG. 14B, at 1448, the mobile device 1432 sends a request 1450 (e.g., that is or includes a previously generated protocol command) to the @sign server 1440 to place the signed challenge value at the particular location.

At 1452, the @sign server 1440 places the signed challenge value at the particular location in the namespace of the @sign server 1440.

At 1454, the web server 1408 sends a lookup request 1456 to the @sign server 1440 for a public key of the user. The public key of the user can be publicly accessible at the @sign server, for example.

At 1458, the @sign server 1440 can retrieve the requested public key from storage of the @sign server 1440.

At 1460, the @sign server 1440 sends a retrieved public key 1462 of the user to the web server 1408.

At 1464, the web server 1408 sends a lookup request 1466 to the @sign server 1440 for the signed challenge value at the particular location in the namespace of the @sign server 1440. The signed challenge value can be publicly accessible at the @sign server, for example, but at a location that is not publicly broadcasted (e.g., using a scan verb). The signed challenge value can have a TTL setting that results in the signed challenge value being available at the particular location only for a predetermined amount of time (e.g., ten seconds).

At 1468, the @sign server 1440 can retrieve the requested signed challenge value from storage of the @sign server 1440.

At 1470, the @sign server 1440 sends a retrieved signed challenge value 1472 to the web server 1408.

At 1473, the web server 1408 uses the public key the user's @sign to decrypt the signed challenge value to generate an extracted challenge value.

At 1474, the web server 1408 compares the extracted challenge value to a challenge value that is based on the challenge code that was previously sent to the user device 1404. As described above, the web server 1408 can perform one or more operations to generate a challenge value to be compared to the extracted challenge value (e.g., the web server can perform a hash operation on a combination of the user's @sign and the challenge code that was sent to the user device 1404).

If the extracted challenge value does not equal the challenge value that the web server 1408 generated for comparison, the web server 1408 can deny a login request for the user (e.g., by generating and providing an error page to the user device 1404. As another example, at 1476, if the extracted challenge value equals the challenge value that the web server 1408 generated for comparison, the web server 1408 can authenticate the user to the web site. The web server 1408 can generate a landing page for the user, for example.

At 1477, the web server 1408 provides a landing page 1478 (e.g., for logged-in users) to the user device 1404. At 1480, the user device 1404 displays the received landing page.

Referring now to FIG. 14C, if the user has shared information using the @protocol with an @sign of the web site (or the web server 1408 or an entity associated with the website/the web server 1408), the web server 1408 can obtain the shared information and use the information in one or more web pages provided to the user device 1404 (or, in general, for one or more processes that the web server 1408 performs on behalf of the user).

At 1482, the web server 1408 sends a lookup request 1484 to the @sign server 1440 for information that the @sign of the user has shared with an @sign of the website. The lookup request 1484 can correspond to the web server 1408 (or a secondary server corresponding to the website, the web server 1408, or the entity of the website) authenticating to the @sign server as the @sign of the website (e.g., according to the public lookup protocols described above).

At 1486, the @sign server 1440 determines if the @sign of the user has shared information with the @sign of the website. If the @sign of the user has shared information with the @sign of the website, the @sign server can retrieve the information shared by the @sign of the user with the @sign of the website.

At 1488, the @sign server 1440 sends retrieved shared information 1489 to the web server 1408.

At 1490, the web server 1408 uses the received shared information. For example, the web server 1408 can use the shared information in one or more server processes. In some cases, the web server 1408 uses the shared information to generate one or more web pages. For some web pages, the shared information is included in the web page (e.g., as pre-filled form fields, for example, or as other webpage content).

At 1492, the web server 1408 sends a web page 1494 that includes (or was generated based on) the shared information shared by the @sign user with the website.

At 1496, the user device 1404 displays the received web page that includes (or was generated based on) the shared information shared by the @sign user with the web site.

Figure 15:
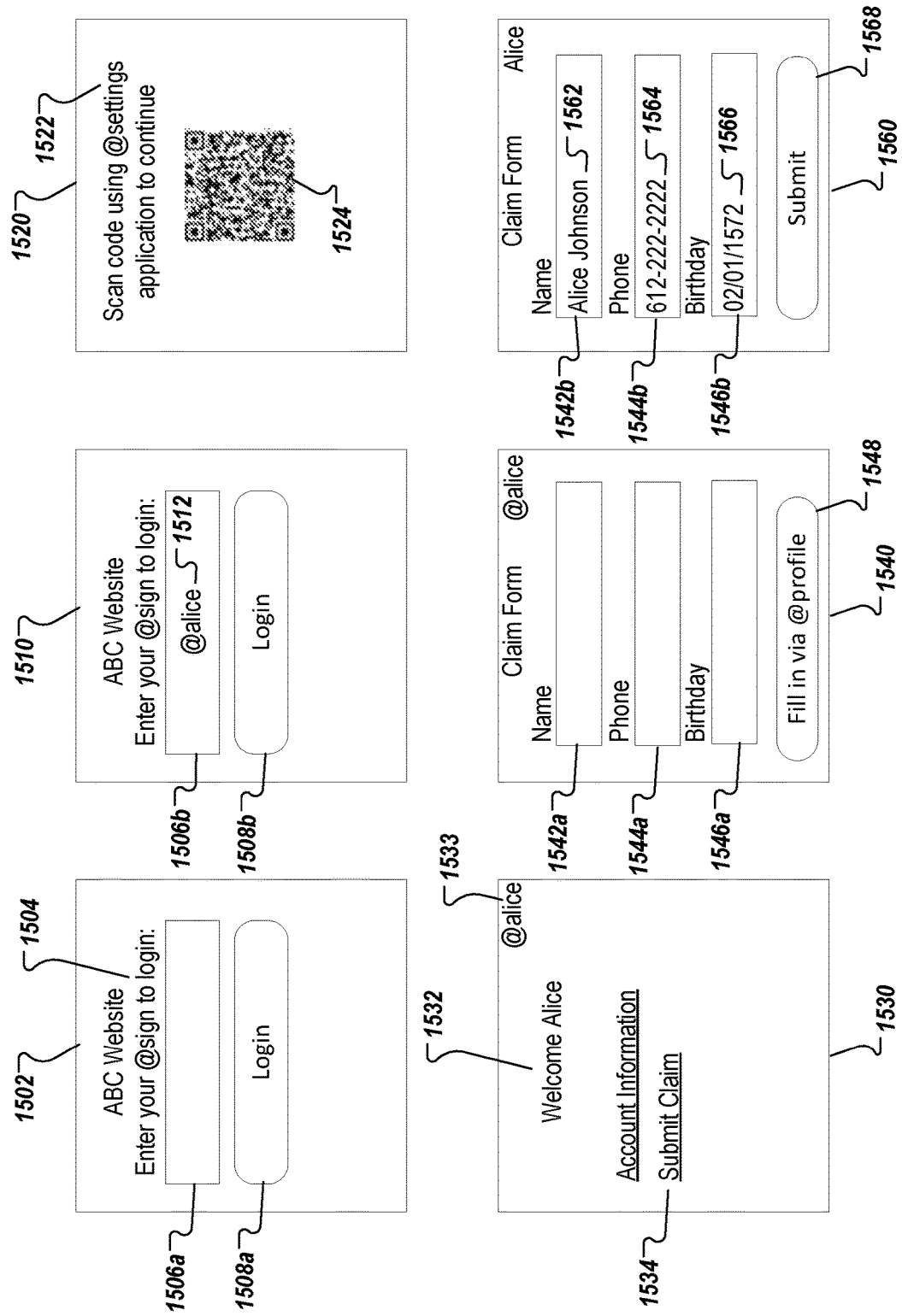
FIG. 15 is a diagram that illustrates example user interfaces for website login scenarios using a protocol for sharing and managing personal information.

FIG. 15 is a diagram 1500 that illustrates example user interfaces for website login scenarios using a protocol for sharing and managing personal information. The example user interfaces are described as web pages, but other types of user interfaces, such as screens of a mobile or desktop application may be used.

A web page 1502 includes a prompt 1504 that informs a user that the user can log in to an "ABC" website using an @sign. A web server that served the web page 1502 can be configured to participate in a login scenario using the @protocol, for example, and can generate and provide the web page 1502 to a user device of the user. The web page 1502 includes a field 1506*a* that can be used by the user to enter an @sign handle and a login button 1508*a* that can be selected to trigger a sending of the @sign handle to the web server.

A web page 1510 that corresponds to the web page 1502 illustrates that the user has entered an @sign handle 1512 of @alice in a field 1506*b* that corresponds to the field 1506*a*. After entering the @sign handle 1512, the user can select a login button 1508*b* that corresponds to the login button 1508*a*. In response to selection of the login button 1508*b*, the @sign handle 1512 can be provided to the web server that provided the web page 1510.

A web page 1520 can be provided the user device by the web server in response to the web server receiving the @sign handle 1512 from the user device. The user device can present the received web page 1520. The web page 1520 includes a prompt 1522 that informs the user to scan a code 1524 using, for example, an @settings or @login application, to continue the login process. In some cases, the user may use a second device (e.g., a mobile device) to scan the code 1524 when the user device that is displaying the web page 1520 is a desktop device, for example. The code 1524 is shown as a QR code. The QR code can embody a PIN that has been randomly generated by the web server. As another example, the QR code can embody a deep link and a PIN that when scanned by the user device can launch (or open) an @login application that receives the PIN upon being launched or opened.

After the user has scanned the code 1524 (or entered a PIN that is presented along with the code 1524), the @login application (or @settings application) running on a user device and the web server can each participate in the @login handshake that is described above with respect to FIGS. 13 and 14A-C. Accordingly, the user can be successfully logged in to the website using features of the @protocol. After the user has been successfully logged in to the website using the @sign of the user, a web page 1530 can be provided to the user device by the web server and the web page 1530 can be presented on the user device.

The web page 1530 includes a label 1532 and a label 1533 that each indicate that the login process using the user's @sign handle completed successfully. In some implementations, the website can be configured to enable the user to use information in their @profile that they have shared with the website (that is, shared with an @sign associated with the website), for example, for use in filling in forms etc. For instance, the user can have the website use information from their @profile instead of the user having to manually enter the information. For instance, the user can select a link 1534 to start a claim submission process that includes a form that can be filled with at least some information from the user's @profile or from information from a secondary server of the user.

A web page 1540 can be provided to the user device by the web server in response to user selection of the link 1534. The web page 1540 is a claim form that includes fields 1542*a*, 1544*a*, and 1546*a* for name, phone, and birthday values, respectively. The web page 1540 includes a button 1548 that the user can select to instruct the web server to retrieve information from the user's @profile (or otherwise from the user's secondary server) so that the user does not need to manually provide information for the fields.

A web page 1560 can be provided to the user device in response to selection of the button 1548. The web page 1560 includes a name value 1562, a phone value 1564, and a birthday value 1566 that have been automatically placed into fields 1542*b*, 1544*b*, and 1546*b* (that correspond to the fields 1542*a*, 1544*a*, and 1546*a*). The name value 1562, the phone value 1564, and the birthday value 1566 can be information that the user has shared, using the @protocol, with an @sign associated with the website/web server. The web server can authenticate to an @sign server of the user and look up and retrieve information for an @alice handle (e.g., name@alice, phone@alice, and birthday@alice) that the @alice user has explicitly given permission for to the @sign associated with the web site/webserver. The user can select a submit button 1568 (e.g., perhaps after entering other information into other fields of the web page 1560) and information from the web page 1560 can be provided to the web server.

Figure 16:
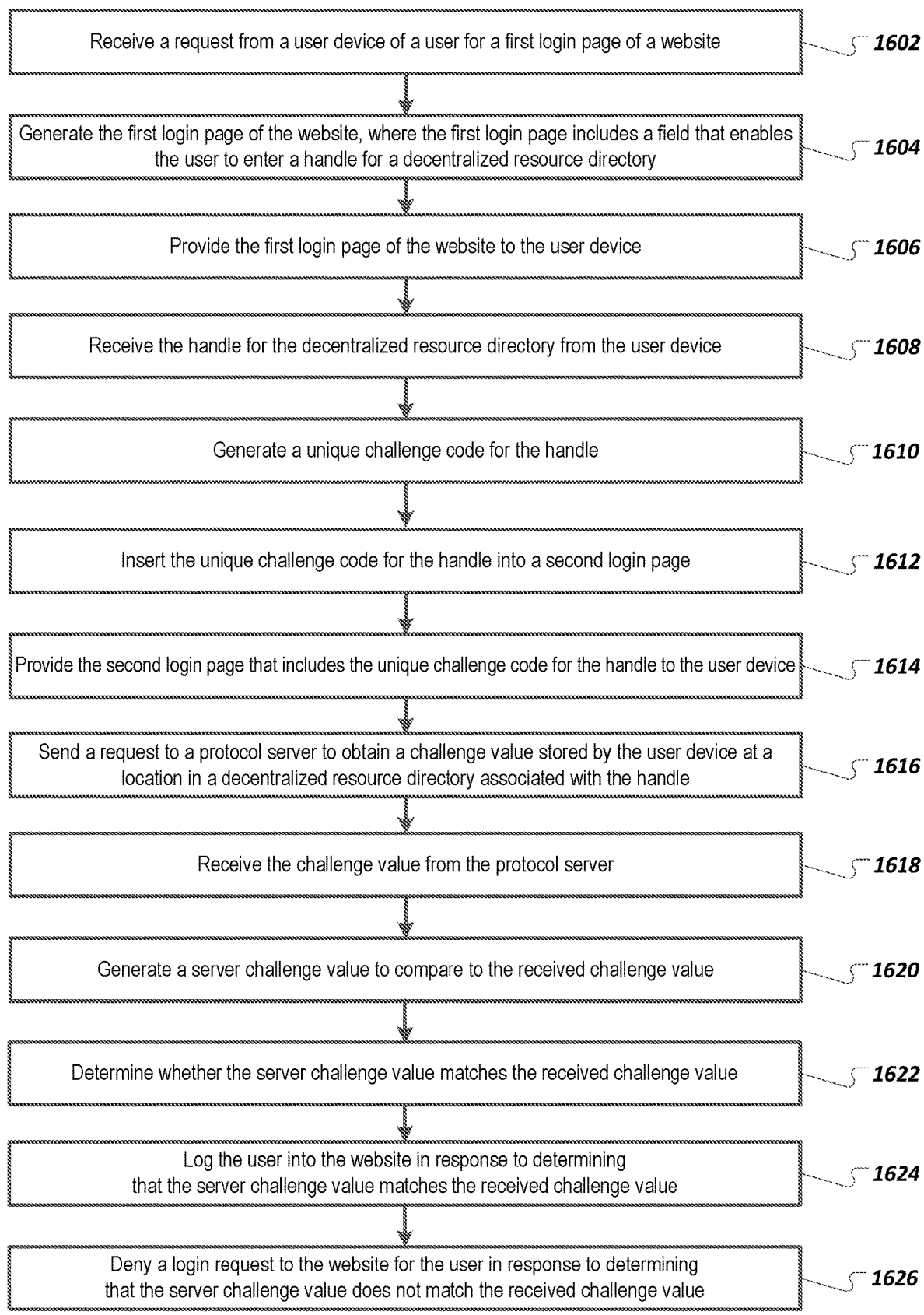
FIG. 16 is a flowchart of an example method for webserver participation in a login process.

FIG. 16 is a flowchart of an example method 1600 for webserver participation in a login process. It will be understood that method 1600 and related methods may be performed, for example, by any suitable system, environment, software, and hardware, or a combination of systems, environments, software, and hardware, as appropriate. In some implementations, the method 1600 is executed by one or more components of the system 1200 described above with respect to FIG. 12. For example, the method 1600 can be executed by the web server 1210.

At 1602, a request is received from a user device of a user for a first login page of a web site.

At 1604, the first login page of the web site is generated. The first login page includes a field that enables the user to enter a handle for a decentralized resource directory.

At 1606, the first login page of the website is provided to the user device.

At 1608, the handle for the decentralized resource directory is received from the user device.

At 1610, a unique challenge code is generated for the handle.

At 1612, the unique challenge code for the handle is inserted into a second login page.

At 1614, the second login page that includes the unique challenge code for the handle is provided to the user device.

At 1616, a request is sent to a protocol server to obtain a challenge value stored by the user device at a location in a decentralized resource directory associated with the handle. The challenge value and the location are generated by the user device based on the challenge code.

At 1618, the challenge value is received from the protocol server.

At 1620, a server challenge value code is generated, using the challenge code sent to the first user device and the handle received from the first user device, to compare to the challenge value received from the protocol server. For example, the server challenge value can be generated by creating a hash of a combination of the challenge code sent to the first user device and the handle received from the first user device. In some implementations, the user device has cryptographically signed the challenge value for the handle using a private key of a public/private key pair for the handle. A request can be sent to the protocol server to obtain a public key of the public/private key pair for the handle from the decentralized resource directory and the challenge value can be decrypted using the public key. In some implementations, the user device has cryptographically signed the challenge value for the handle using a public key of a public/private key pair associated with the website and the challenge value received from the protocol server can be decrypted using a private key of the public/private key pair associated with the website.

At 1622, a determination is made as to whether the server challenge value matches the challenge value received from the protocol server (e.g., after possible decryption of the received challenge value).

At 1624, the user is logged into the website in response to determining that the server challenge value matches the received challenge value.

At 1626, a login request to the website is denied for the user in response to determining that the server challenge value does not match the received challenge value.

In some implementations, the decentralized resource directory includes shared user information for the user that the user has explicitly shared with an entity associated with the website. A request can be sent to the protocol server for the shared user information and the shared user information can be used to generate at least one web page for the user while the user is logged into the website.

Figure 17:
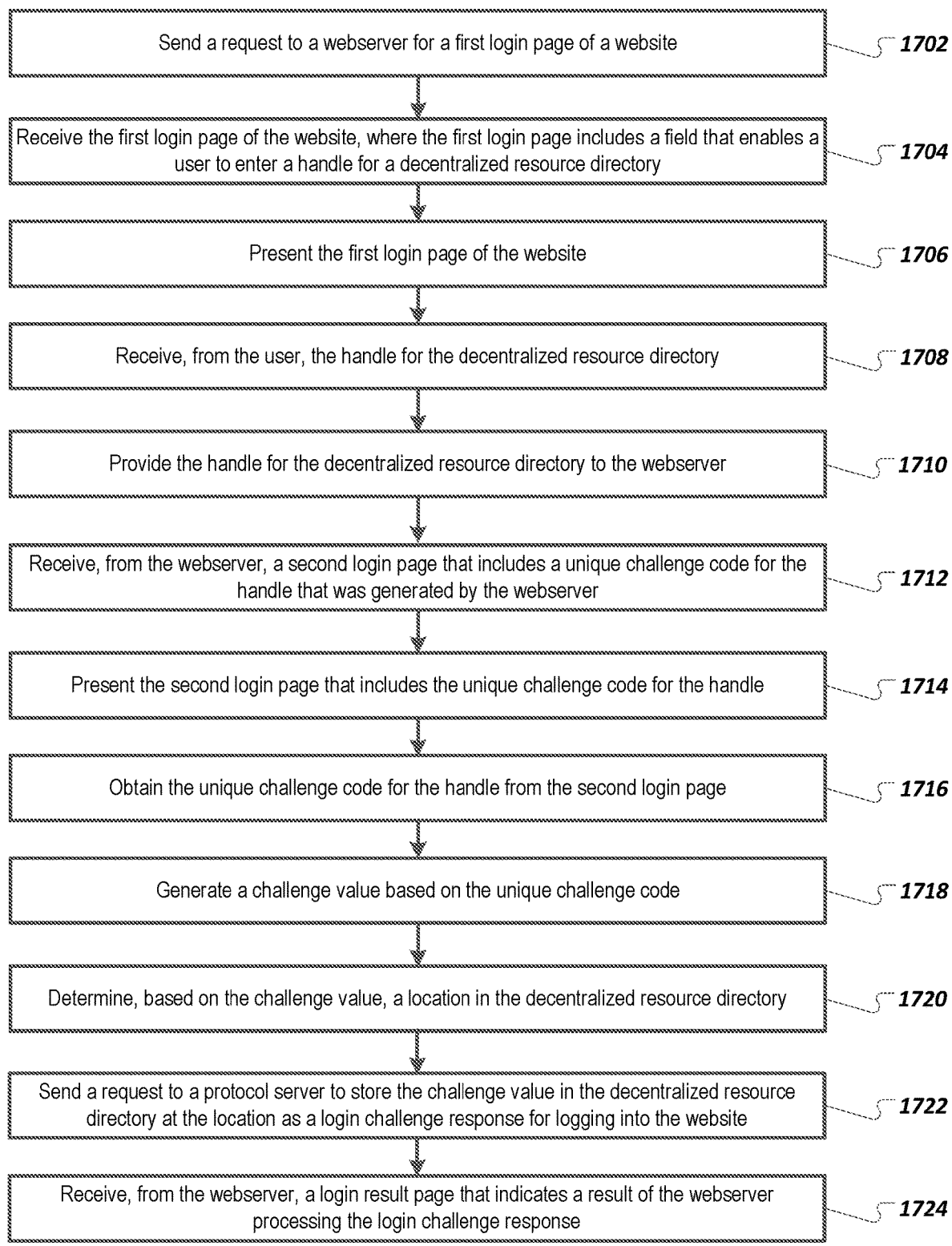
FIG. 17 is a flowchart of an example method for client participation in a login process.

FIG. 17 is a flowchart of an example method for client participation in a login process. It will be understood that method 1700 and related methods may be performed, for example, by any suitable system, environment, software, and hardware, or a combination of systems, environments, software, and hardware, as appropriate. In some implementations, the method 1700 is executed by one or more components of the system 1200 described above with respect to FIG. 12. For example, the method 1700 can be executed by the user device 1208.

At 1702, a request is sent to a webserver for a first login page of a website.

At 1704, the first login page of the website is received. The first login page includes a field that enables a user to enter a handle for a decentralized resource directory.

At 1706, the first login page of the website is presented to the user.

At 1708, the handle for the decentralized resource directory is received from the user.

At 1710, the handle for the decentralized resource directory is provided to the web server.

At 1712, a second login page that includes a unique challenge code for the handle is received from the webserver. The first login page can also include a field that allows the user to provide a user-provided code and the user-provided code can be provided to the webserver along with the handle. The unique challenge code received from the webserver can be generated by the webserver based on the user-provided code.

At 1714, the second login page that includes the unique challenge code for the handle is presented.

At 1716, the unique challenge code for the handle is obtained from the second login page.

At 1718, a challenge value is generated based on the unique challenge code. The challenge value for the handle can be encrypted using a private key of a public/private key pair for the handle. The private key of the public/private key pair for the handle from can be retrieved from a user device of the user. The challenge value for the handle can be signed using a public key of a public/private key pair associated with the website.

At 1720, a location in the decentralized resource directory is determined, based on the challenge value.

At 1722, a request is sent to a protocol server to store the challenge value in the decentralized resource directory at the location as a login challenge response for logging into the website.

At 1724, a login result page is received from the webserver that indicates a result of the webserver processing the login challenge response. The login result page can indicate that the webserver successfully validated the login challenge response.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A system comprising:
a first user device of a user;
a protocol server associated with the user comprising a personal decentralized resource directory of the user; and
a webserver associated with a website;
wherein the first user device is configured to:
send a request to the webserver for a first login page of the website;
wherein the webserver is configured to:
receive the request for the first login page of the website;
generate the first login page of the website, wherein the first login page includes a field that enables the user to enter a handle that uniquely identifies the personal decentralized resource directory of the user; and
provide the first login page of the website to the first user device;
wherein the first user device is further configured to:
receive the first login page of the website;
present the first login page of the website;
receive, from the user, the handle that uniquely identifies the personal decentralized resource directory of the user; and
provide the handle for the personal decentralized resource directory of the user to the webserver;
wherein the webserver is further configured to:
receive the handle for the personal decentralized resource directory of the user from the first user device;
generate a unique challenge code for the handle;
insert the unique challenge code for the handle into a second login page; and
provide the second login page that includes the unique challenge code for the handle to the first user device;
wherein the first user device is further configured to:
receive the second login page that includes the unique challenge code for the handle;
present the second login page that includes the unique challenge code for the handle;
obtain the unique challenge code for the handle from the second login page;
generate a challenge value based on the unique challenge code;
determine, based on the challenge value, a location in the personal decentralized resource directory of the user; and
send a request to the protocol server to store the challenge value in the personal decentralized resource directory of the user at the location;
wherein the webserver is further configured to:
send a request to the protocol server to obtain the challenge value from the location in the personal decentralized resource directory of the user;
receive the challenge value from the protocol server;
generate a server challenge value, using the challenge code sent to the first user device and the handle received from the first user device, to compare to the challenge value received from the protocol server;
determine whether the server challenge value matches the challenge value received from the protocol server;
log the user into the website in response to determining that the server challenge value matches the challenge value received from the protocol server; and
deny a login request to the website for the user in response to determining that the server challenge value does not match the challenge value received from the protocol server.

2. The system of claim 1, wherein:
the first user device is configured to cryptographically sign the challenge value for the handle using a private key of a public/private key pair for the handle; and
the webserver is further configured to:
send a request to the protocol server to obtain a public key of the public/private key pair for the handle from the personal decentralized resource directory of the user;
receive, from the protocol server, the public key of the public/private key pair for the handle; and
decrypt the challenge value using the public key.

3. The system of claim 2, wherein the private key of the public/private key pair for the handle is stored on the first user device.

4. The system of claim 1, wherein:
the first user device is configured to cryptographically sign the challenge value for the handle using a public key of a public/private key pair associated with the website; and
the webserver is further configured to decrypt the challenge value using a private key of the public/private key pair associated with the website.

5. The system of claim 1, wherein:
the first login page includes a field that allows the user to provide a user-provided code;
the first user device is configured to provide the user-provided code to the webserver along with the handle of the user; and
the webserver is configured to generate the challenge code using the user-provided code.

6. The system of claim 1, further comprising a second user device of the user, wherein the first login page is presented on the first user device and the user second device is configured to generate the challenge value, determine the location in the personal decentralized resource directory of the user, and send the request to the protocol server to store the challenge value in the personal decentralized resource directory of the user at the location.

7. The system of claim 6, wherein the challenge code is a scannable code that is presented on the first user device and the second user device is configured to scan the scannable code that is presented on the first user device.

8. The system of claim 1, wherein:
the personal decentralized resource directory of the user includes shared user information for the user that the user has explicitly shared with an entity associated with the website; and
the webserver is further configured to:
send a request to the protocol server for the shared user information for the user in the personal decentralized resource directory of the user that has been explicitly shared with the entity associated with the website;
receive the shared user information;
use the shared user information to generate at least one web page for the user while the user is logged into the website; and
provide the at least one web page to the first user device.

9. The system of claim 1, wherein the first user device is further configured to generate the challenge value based on the unique challenge code by generating a hash value of a combination of the handle and the unique challenge code.

10. The system of claim 1,
wherein the first user device is further configured to:
  generate a nonce value;
  generate the challenge value based on the challenge code and the nonce value; and
  send a request to the protocol server to store the nonce value in the personal decentralized location of the user at the location that is based on the challenge code;
wherein the webserver is further configured to:
  send a request to the protocol server to obtain the nonce from the decentralized resource directory;
  receive the nonce from the protocol server; and
  use the nonce when generating the server challenge value.

11. A computer-implemented method comprising:
receiving a request from a user device of a user for a first login page of a website;
generating the first login page of the website, wherein the first login page includes a field that enables the user to enter a handle that uniquely identifies a personal decentralized resource directory of the user;
providing the first login page of the website to the user device;
receiving the handle that uniquely identifies the personal decentralized resource directory of the user from the user device;
generating a unique challenge code for the handle;
inserting the unique challenge code for the handle into a second login page;
providing the second login page that includes the unique challenge code for the handle to the user device;
sending a request to a protocol server to obtain a challenge value stored by the user device at a location in the personal decentralized resource directory of the user, wherein the challenge value and the location are generated by the user device based on the challenge code;
receiving the challenge value from the protocol server;
generating a server challenge value, using the challenge code sent to the user device and the handle received from the user device, to compare to the challenge value received from the protocol server;
determining whether the server challenge value matches the challenge value received from the protocol server;
logging the user into the website in response to determining that the server challenge value matches the challenge value received from the protocol server; and
denying a login request to the website for the user in response to determining that the server challenge value does not match the challenge value received from the protocol server.

12. The computer-implemented method of claim 11, wherein the user device has cryptographically signed the challenge value for the handle using a private key of a public/private key pair for the handle, the method further comprising:
sending a request to the protocol server to obtain a public key of the public/private key pair for the handle from the decentralized resource directory;
receiving, from the protocol server, the public key of the public/private key pair for the handle; and
decrypting the challenge value using the public key.

13. The computer-implemented method of claim 11, wherein the user device has cryptographically signed the challenge value for the handle using a public key of a public/private key pair associated with the website, the method further comprising decrypting the challenge value received from the protocol server using a private key of the public/private key pair associated with the website.

14. The computer-implemented method of claim 11, wherein:
the decentralized resource directory includes shared user information for the user that the user has explicitly shared with an entity associated with the website, the method further comprising:
  sending a request to the protocol server for the shared user information for the user in the personal decentralized resource directory of the user that has been explicitly shared with the entity associated with the website;
  receiving the shared user information;
  using the shared user information to generate at least one web page for the user while the user is logged into the website; and
  providing the at least one web page to the user device.

15. A computer-implemented method comprising:
sending a request to a webserver for a first login page of a website;
receiving the first login page of the website, wherein the first login page includes a field that enables a user to enter a handle that uniquely identifies a personal decentralized resource directory of the user;
presenting the first login page of the website;
receiving, from the user, the handle that uniquely identifies the personal decentralized resource directory of the user;
providing the handle that uniquely identifies the personal decentralized resource directory of the user to the webserver;
receiving, from the webserver, a second login page that includes a unique challenge code for the handle that was generated by the webserver;
presenting the second login page that includes the unique challenge code for the handle;
obtaining the unique challenge code for the handle from the second login page;
generating a challenge value based on the unique challenge code;
determining, based on the challenge value, a location in the personal decentralized resource directory of the user;
sending a request to a protocol server to store the challenge value in the personal decentralized resource directory of the user at the location as a login challenge response for logging into the website; and
receiving from the webserver, a login result page that indicates a result of the webserver processing the login challenge response.

16. The computer-implemented method of claim 15, wherein the login result page indicates that the webserver successfully validated the login challenge response.

17. The computer-implemented method of claim 15, further comprising cryptographically signing the challenge value for the handle using a private key of a public/private key pair for the handle.

18. The computer-implemented method of claim 17, further comprising retrieving the private key of the public/private key pair for the handle from a user device of the user.

19. The computer-implemented method of claim 15, further comprising cryptographically signing the challenge value for the handle using a public key of a public/private key pair associated with the website.

20. The computer-implemented method of claim 15, wherein the first login page includes a field that allows the user to provide a user-provided code, the method further comprising:
    receiving, from the user, the user-provided code; and
    providing the user-provided code to the webserver along with the handle of the user, wherein the unique challenge code received from the webserver is generated by the webserver based on the user-provided code.

\* \* \* \* \*